(12) United States Patent
Okamura

(10) Patent No.: US 11,482,116 B2
(45) Date of Patent: Oct. 25, 2022

(54) COMMUNICATION APPARATUS AND COMMUNICATION CONTROL METHOD

(71) Applicant: Panasonic Intellectual Property Management Co., Ltd., Osaka (JP)

(72) Inventor: Shutai Okamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 16/628,861

(22) PCT Filed: Feb. 8, 2018

(86) PCT No.: PCT/JP2018/004351
§ 371 (c)(1),
(2) Date: Jan. 6, 2020

(87) PCT Pub. No.: WO2019/008811
PCT Pub. Date: Jan. 10, 2019

(65) Prior Publication Data
US 2020/0226935 A1    Jul. 16, 2020

Related U.S. Application Data

(60) Provisional application No. 62/542,821, filed on Aug. 9, 2017, provisional application No. 62/535,969, filed
(Continued)

(51) Int. Cl.
*G08G 5/00* (2006.01)
*G01C 5/00* (2006.01)
(Continued)

(52) U.S. Cl.
CPC ........... *G08G 5/0021* (2013.01); *G01C 5/005* (2013.01); *H04B 7/18506* (2013.01); *H04W 52/18* (2013.01)

(58) Field of Classification Search
CPC .................................................. G08G 5/0021
See application file for complete search history.

(56) References Cited

U.S. PATENT DOCUMENTS

| | | | |
|---|---|---|---|
| 5,111,403 A | 5/1992 | Orgun et al. | |
| 6,587,078 B1 * | 7/2003 | Doty ....................... | F41G 7/305 244/3.1 |

(Continued)

FOREIGN PATENT DOCUMENTS

| | | | |
|---|---|---|---|
| EP | 2690455 | * | 7/2012 |
| EP | 3251108 B1 | * | 12/2015 |

(Continued)

OTHER PUBLICATIONS

Christodolou, Manolis, et al, Nonlinear Mixed Integer Programming for Aircraft Collision Avoidance in Free Flight, IEEE MELECON 2004, May 12-15, 2004, Dubrovnik, Croatia, (https://ieeexplore.ieee.org/stamp/stamp.jsp?tp=&arnumber=1346858) (2004)( Hereinafter "Christodoulou").*

(Continued)

*Primary Examiner* — Jean Paul Cass
(74) *Attorney, Agent, or Firm* — Wenderoth, Lind & Ponack, L.L.P.

(57) ABSTRACT

The communication apparatus (1100) configured to be installed in a first aircraft (1b) comprises a controller (1110) and a transmitter (1106). The controller (1110) is configured to acquire resource information and determine a communication condition based on the resource information, the resource information being related to a second aircraft (1a) different from the first aircraft (1b) or to a radio altimeter installed in the second aircraft (1a). The transmitter (1106) is configured to transmit transmission data to one other communication apparatus installed in the first aircraft (1b), according to the communication condition.

5 Claims, 54 Drawing Sheets

Related U.S. Application Data on Jul. 24, 2017, provisional application No. 62/529,480, filed on Jul. 7, 2017.

(51) Int. Cl.
*H04B 7/185* (2006.01)
*H04W 52/18* (2009.01)

(56) References Cited

U.S. PATENT DOCUMENTS

| | | | | |
|---|---|---|---|---|
| 8,467,733 | B2* | 6/2013 | Leabman | H01Q 1/246 |
| | | | | 455/63.4 |
| 8,738,064 | B2 | 5/2014 | Hofmann et al. | |
| 9,244,155 | B2* | 1/2016 | Bielas | H01Q 3/2605 |
| 9,479,964 | B2* | 10/2016 | Jalali | H04L 5/0071 |
| 10,383,130 | B2 | 8/2019 | Rajendran et al. | |
| 10,747,217 | B1* | 8/2020 | Koenck | G05D 1/0022 |
| 2002/0142732 | A1 | 10/2002 | Asano | |
| 2004/0142658 | A1 | 7/2004 | McKenna et al. | |
| 2009/0052386 | A1 | 2/2009 | Higashida | |
| 2010/0311460 | A1 | 12/2010 | Hofmann et al. | |
| 2016/0277161 | A1 | 9/2016 | Haque et al. | |
| 2017/0134059 | A1* | 5/2017 | Eskridge, Jr. | H04W 84/06 |
| 2017/0176588 | A1 | 6/2017 | Franceschini et al. | |
| 2017/0180072 | A1 | 6/2017 | Timm et al. | |
| 2017/0181146 | A1 | 6/2017 | Franceschini et al. | |
| 2017/0230916 | A1 | 8/2017 | Stein et al. | |

FOREIGN PATENT DOCUMENTS

| | | |
|---|---|---|
| EP | 3 182 150 | 6/2017 |
| EP | 3 182 781 | 6/2017 |
| JP | 2005-217783 | 8/2005 |
| JP | 2010-213266 | 9/2010 |
| JP | 2013-128244 | 6/2013 |
| JP | 2013-157771 | 8/2013 |
| WO | 2008/004577 | 1/2008 |
| WO | 2013/056136 | 4/2013 |

OTHER PUBLICATIONS

Extended European Search Report dated May 7, 2020 in corresponding European Patent Application No. 18827689.3.
Extended European Search Report dated Apr. 1, 2020 in corresponding European Patent Application No. 18827688.5.
International Search Report dated May 15, 2018 in International (PCT) Application No. PCT/JP2018/004351.
International Search Report dated May 15, 2018 in International (PCT) Application No. PCT/JP2018/004352.
Office Action dated Sep. 29, 2020 in corresponding U.S. Appl. No. 16/629,196.
Hanschke et al., "Radio Altimeter Interference Mitigation in Wireless Avionics Intra-Communication Networks", 2017, 15th International Symposium on Modeling and Optimization in Mobile, Ad Hoc, and Wireless Networks.

* cited by examiner

FIG. 6

| ALTITUDE INFORMATION | TRANSMITTION POWER |
|---|---|
| 4000ft OR MORE | 10 dBm |
| LESS THAN 4000ft | 1 dBm |

FIG. 7

| ALTITUDE INFORMATION | TRANSMITTION POWER |
|---|---|
| 4000ft OR MORE | 10 dBm |
| 2000ft OR MORE LESS THAN 4000ft | 1 dBm |
| 1000ft OR MORE LESS THAN 2000ft | 3 dBm |
| 100ft OR MORE LESS THAN 1000ft | 6 dBm |
| LESS THAN 100ft | 10 dBm |

FIG. 8

| ALTITUDE INFORMATION | TRANSMITTION POWER |
|---|---|
| 0 0 0 | 1 0 dBm |
| 0 0 1 | 1 dBm |
| 0 1 0 | 3 dBm |
| 0 1 1 | 6 dBm |
| 1 0 0 | 1 0 dBm |

FIG. 13

| TRANSMISSION FRAME |
|---|

COMMUNICATION APPARATUS AND COMMUNICATION CONTROL METHOD

TECHNICAL FIELD

The present disclosure relates to a wireless communication apparatus and a wireless communication control method to be used in aircraft.

BACKGROUND

Demand for making a wireless communication environment in aircraft is increasing. For this purpose, the Wireless Avionics Intra-Communication (WAIC) system has been standardized as a wireless communication system in aircraft. As the wireless frequency band used by communication apparatuses in the WAIC system, the 4.2 GHz to 4.4 GHz band has been allotted by the ITU.

SUMMARY OF INVENTION

Problem to be Solved by Invention

A radio altimeter that measures the altitude of aircraft using radio waves of the 4.2 GHz to 4.4 GHz band is installed in aircraft. Therefore, the radio waves from the communication apparatus (wireless device) of the WAIC system possibly interfere with those from the radio altimeter. This could cause malfunction of the radio altimeter or communication jamming between the communication apparatuses in aircraft.

Several communication methods for avoiding interference with a radio altimeter have been proposed (see Patent Document 1, Patent Document 2, and Patent Document 3). However, because the environment inside and outside aircraft change in various ways, it is required to enable stable wireless communication even if such changes occur.

Means for Solving the Problems

An object of the present disclosure is to provide a communication apparatus and a communication control method that are effective for preventing the influence of radio wave interference between a radio altimeter and a communication apparatus in aircraft.

The communication apparatus in the present disclosure is a communication apparatus configured to be installed in a first aircraft, comprising a controller and a transmitter. The controller is configured to acquire resource information and determine a communication condition based on the resource information, the resource information being related to a second aircraft different from the first aircraft or to a radio altimeter installed in the second aircraft. The transmitter is configured to transmit transmission data to one other communication apparatus installed in the first aircraft, according to the communication condition.

Effect of Invention

The communication apparatus and the communication control method according to the present disclosure are effective for preventing the influence of radio wave interference between the radio altimeter and the communication apparatus in aircraft.

BRIEF DESCRIPTION OF DRAWINGS

FIG. 6 shows an example of control information for transmission power.

FIG. 7 shows an example of control information for transmission power.

FIG. 8 shows an example of control information for transmission power.

FIG. 13 shows a transmission frame.

DETAILED DESCRIPTION

Hereinafter, the Embodiments will be described in detail with reference to the drawings as appropriate. Any explanations deemed unnecessary may be omitted. For example, detailed descriptions of well-known aspects or duplicate descriptions of substantially identical components may be omitted from this disclosure.

It is to be noted that the attached drawings and the following description are provided to enable those skilled in the art to fully understand the present disclosure, and they are not intended to limit the claimed subject matter.

<Radio Altimeter>

Figure 1:
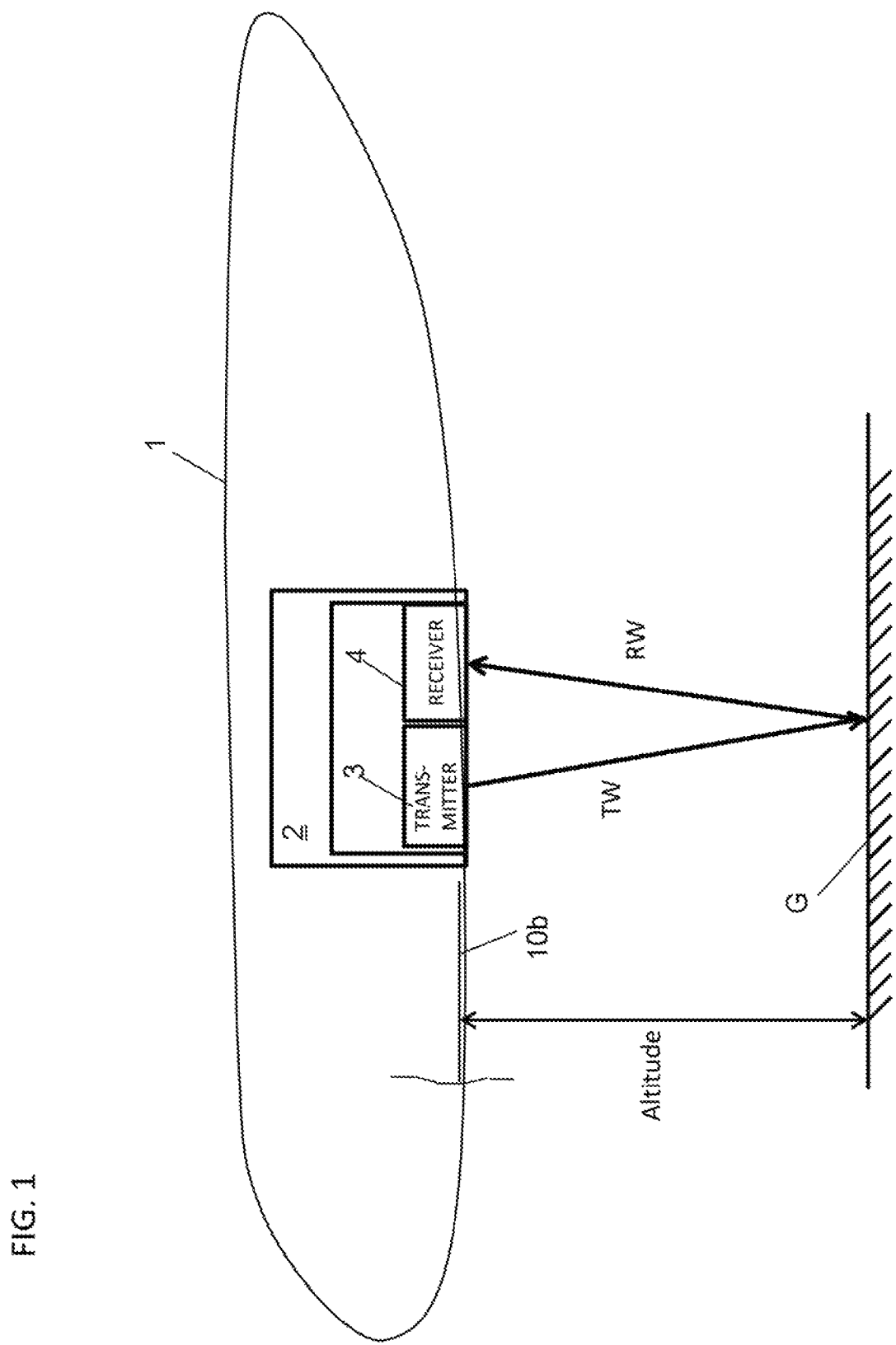
FIG. 1 schematically shows a radio altimeter installed in an aircraft.

FIG. 1 schematically shows a radio altimeter 2 that is mounted at the bottom 10b of an aircraft 1. The radio altimeter 2 comprises a transmitter 3 and a receiver 4. The transmitter 3 transmits transmission waves TW. The transmission waves TW are radiated downward (towards the ground surface G) from the bottom 10b of the aircraft 1. The transmission waves TW are reflected by the ground surface G and then received by the receiver 4 as reception waves RW that are reflected waves. At this time, the reception waves RW are received by the receiver 4 with a time delay with respect to when the transmission waves TW were transmitted by the transmitter 3. The time delay equals (2×altitude)/light speed. Therefore, it is possible to find the altitude of the aircraft 1 from this time delay.

Figure 2:
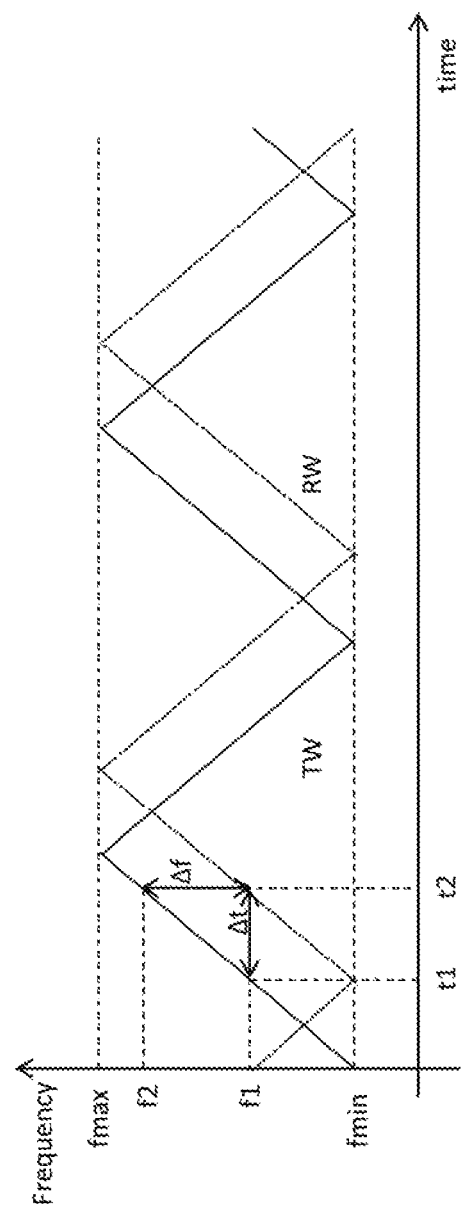
FIG. 2 shows a signal waveform of a radio altimeter.

FIG. 2 shows a wave form of signals from the radio altimeter 2. Radio altimeters which utilize frequency-modulated continuous waves (FMCW) are widely used as radio altimeters in civilian aircraft. The FMCW type radio altimeter transmits transmission waves by modulating the frequency of carrier waves. As shown in FIG. 2, the frequency of carrier waves in the transmission waves TW from the transmitter 3 is continuously swept in a given frequency width to form a sweep waveform. The sweep waveform is a triangle wave and, in many cases, the sweep frequency is for 50 to 300 Hz. The transmitter 3 performs the modulation so as to increase the frequency of carrier waves as the level of the sweep waveform gets higher and decrease the frequency of carrier waves as the level of the sweep waveform gets lower.

As stated above, the radio altimeter 2 operates in the 4.2-4.4 GHz band. Of the 200 MHz frequency bandwidth that can be used by the radio altimeter 2, the 100 to 150 MHz which is a mid band is often used. The transmission power ranges from 10 mW (+10 dBm) to 500 mW (+27 dBm).

Since the reception waves RW received by the receiver 4 are delayed compared with the transmission waves TW, the frequency of the reception waves RW differ from the frequency of the transmission waves TW. If the change (sweep) rate of the frequency of the transmission waves TW is constant, the delay time, i.e. altitude, is directly proportional to the difference in the measured frequencies of the transmission waves TW and the reception waves RW.

Figure 3:
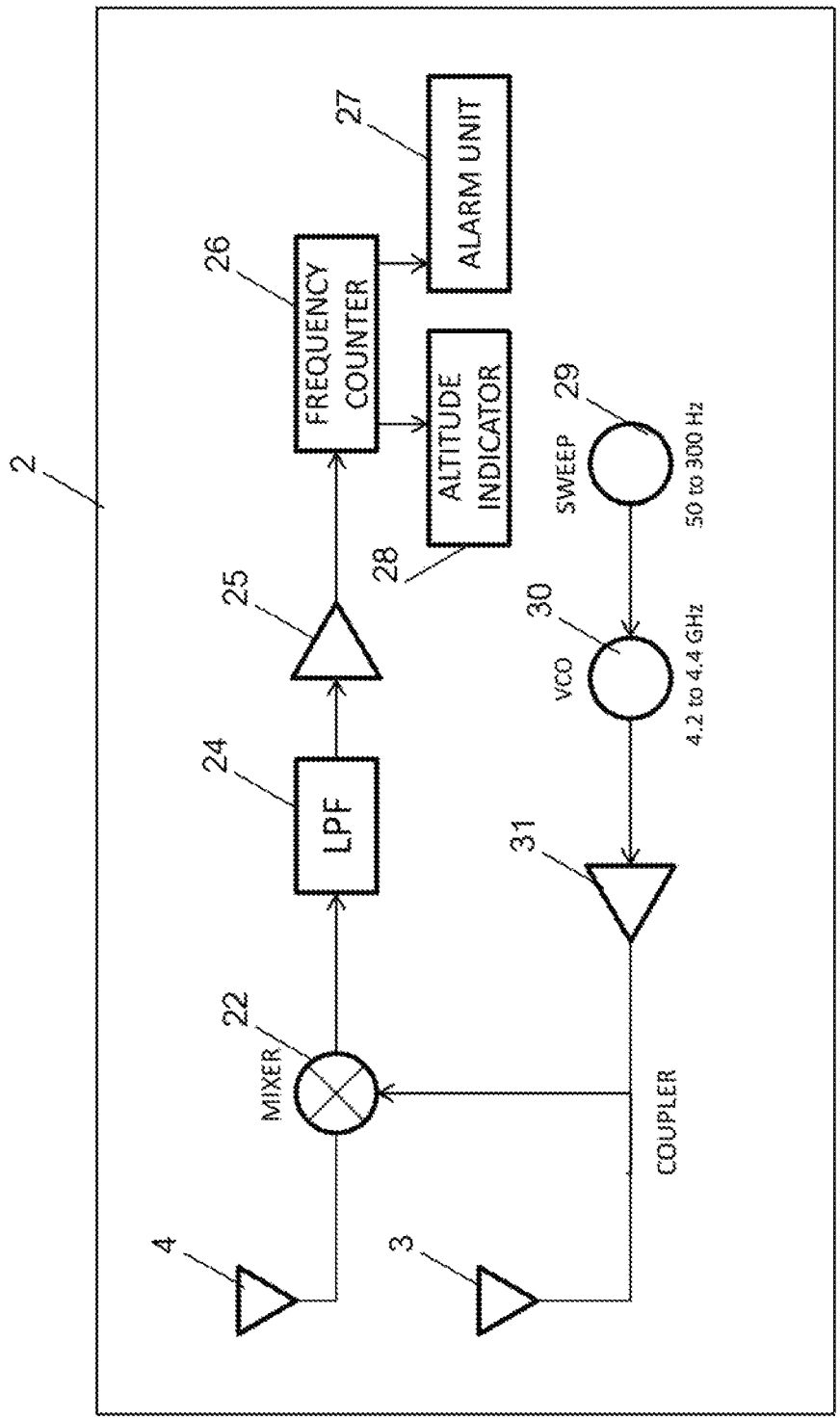
FIG. 3 shows an internal configuration of an FMCW type radio altimeter.

FIG. 3 shows a general internal configuration of a FMCW-type radio altimeter. The receiver 4 including a reception antenna inputs reception waves into a frequency mixer 22. The frequency mixer 22 outputs the difference in the frequencies of the transmission waves and the reception waves. The transmitter 3 including a transmission antenna inputs part of the transmission waves into the homodyne-type frequency mixer 22. The output is inputted into the reception low-pass filer (LPF). The reception LPF 24 detects a beat signal, which is the frequency difference between the transmitter 3 and the receiver 4 from the output of the reception mixer 22.

The frequency counter 26 detects the frequency of the beat signal (beat frequency). In many cases, the beat frequency is 1 MHz or less. The radio altimeter 2 estimates an altitude from the beat frequency, and outputs the altitude to an alarm unit 27 and an altitude indicator 28. As the beat frequency is higher, the time delay Δt in FIG. 2 is larger, and whereas the beat frequency is lower, the time delay Δt in FIG. 2 is smaller.

The radio altimeter 2 is provided with a sweep generator 29 and a voltage-controlled oscillator 30 for generating transmission waves. The sweep generator 29 generates a triangle sweep waveform. The voltage-controlled oscillator 30 inputs the generated sweep waveform signals to generate radio signals of which frequency varies according to the voltage values corresponding to the sweep waveform. The generated radio waves are transmitted by the transmitter 3 after passing the buffer amplifier 31.

Figure 4:
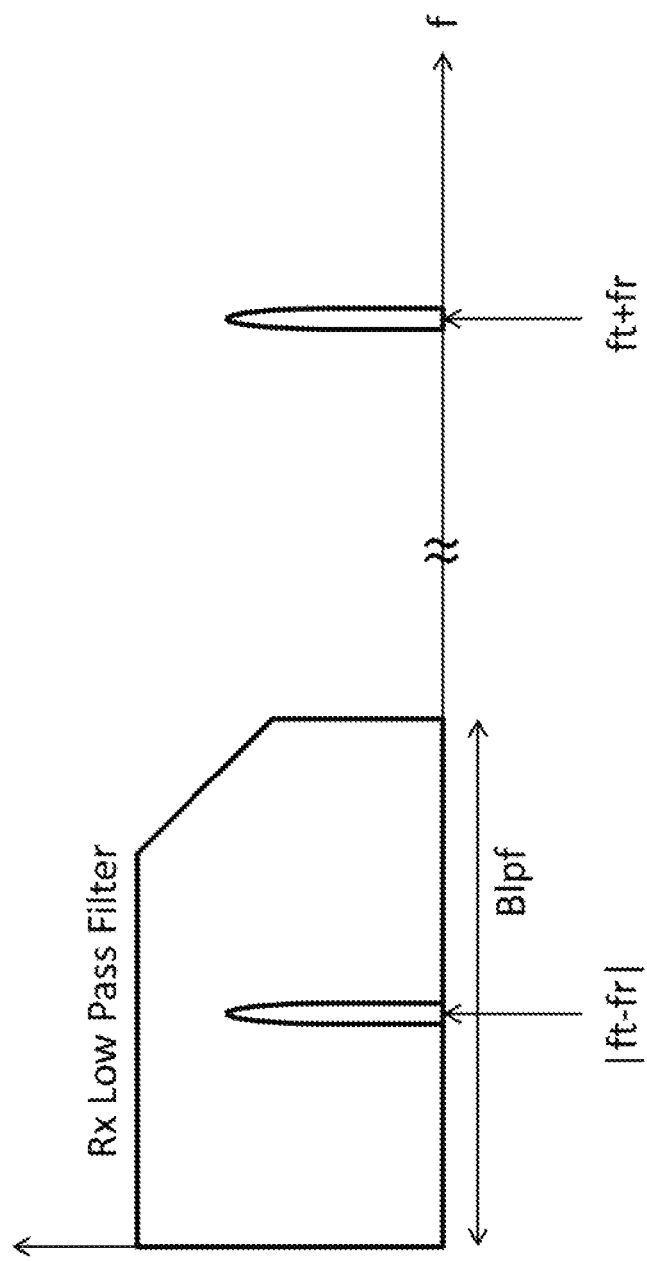
FIG. 4 shows a relationship between a beat signal of a radio altimeter and a bandwidth of a reception LPF.

FIG. 4 shows a relationship between the beat signal and the bandwidth of the reception LPF 24. The frequency mixer 22 multiplies the transmission frequency ft and reception frequency fr of the radio altimeter 2, and from the ft+fr component and ft−fr component obtained as the result, extracts only the differential component (ft−fr) corresponding to the beat signal by the LPF 24. The bandwidth Blpf of the reception LPF 24 is designed to be greater than the beat frequency, and to be smaller than the sum component (ft+fr).

As stated above, a typical radio altimeter continuously uses the 200 MHz bandwidth, centered on 100 to 150 MHz, in the 4.2 to 4.4 GHz band assigned in the WAIC system. For that reason, interference occurs due to a communication apparatus of the WAIC system using the same frequency band as the radio altimeter. In particular, when an interference component is included in the received signal of the radio altimeter, an error may result in the cruising altitude of an aircraft which could interfere with safe flight. Therefore, such interference must be avoided.

The present disclosure relates to a communication apparatus adopting a transmission method that does not cause interference with a radio altimeter and therefore, the communication apparatus can use the frequency band used by the radio altimeter. For example, the communication apparatus transmits a transmission signal so as to prevent the transmission signal from being included in the bandwidth Blpf of the reception LPF 24 in the radio altimeter as shown in FIG. 4, thereby avoiding interference with the radio altimeter. For example, as described later, a frequency spectrum of the transmission signal is controlled so that the absolute value of a difference between the frequency used for the transmission signal of the communication apparatus and the frequency used for the transmission signal of the radio altimeter is greater than a cutoff frequency of the LPF applied to the received signal of the radio altimeter. When the signal from the communication apparatus is out of the bandwidth Blpf of the reception LPF 24, the signal is cut off by the reception LPF 24 of the radio altimeter, thereby causing no interference with the radio altimeter. In other words, the communication apparatus transmits and receives signals using a frequency range out of the bandwidth of the reception LPF 24 in the radio altimeter, according to the timing of a frequency sweep of the radio altimeter.

Embodiment 1

According to this embodiment, the communication apparatus used in an aircraft changes its transmission power for transmitting a radio signal in accordance with an altitude of the aircraft.

Figure 5:
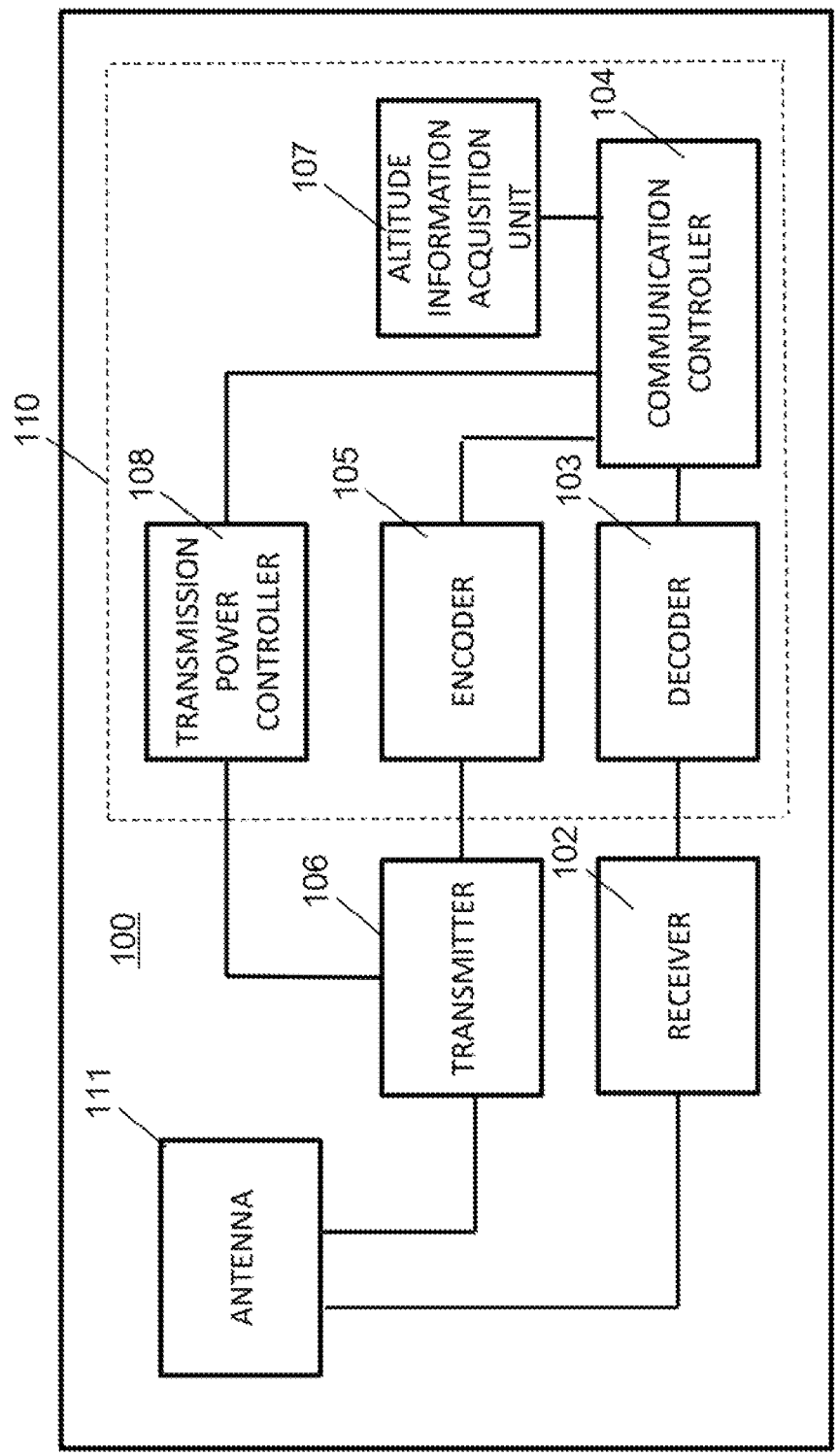
FIG. 5 shows a configuration of a communication apparatus according to Embodiment 1.

FIG. 5 shows the configuration of a communication apparatus 100 according to Embodiment 1. The communication apparatus 100 comprises an antenna 111, a receiver 102, a decoder 103, a communication controller 104, an encoder 105, a transmitter 106, an altitude information acquisition unit 107, and a transmission power controller 108.

In the communication apparatus 100, a signal received by the antenna 111 is sent to the receiver 102. The receiver 102 performs reception processing and transmits the received signal, which has been digitalized, to the decoder 103.

The communication apparatus 100 includes a processor 110 including electronic circuitry such as a CPU. The processor 110 executes control and calculation for the communication apparatus according to a predetermined algorithm, thereby preforming the functions of the decoder 103, the communication controller 104, the encoder 105, the altitude information acquisition unit 107, and the transmission power controller 108.

The decoder 103 decodes the received signal to extract reception data. The communication controller 104 reads a destination address included in the reception data, and when the reception data is addressed to the communication apparatus itself, performs processing of the reception data.

The altitude information acquisition unit 107 acquires altitude information of the aircraft 1, and transmits the acquired altitude information to the communication controller 104. The method for acquiring altitude information of the aircraft 1 by the altitude information acquisition unit 107 may include acquiring the present altitude by connecting to the radio altimeter 2 or another instrument, receiving a notification from another communication apparatus that holds the altitude information, acquiring by a crew member of the aircraft inputting the altitude information, or such other method.

When the communication apparatus 100 transmits a signal to another communication apparatus, the communication controller 104 determines generation of data to be transmitted and transmission parameters. The transmission parameters include an encoding scheme, an encoding rate, a modulation scheme, a frequency band, precoding information, a channel to be used, transmission power, or such other parameter. Based on the altitude information acquired by the altitude information acquisition unit 107, the communication controller 104 determines the transmission power of the communication apparatus 100, and transmits the transmission power figure to the transmission power controller 108.

As one example, the communication controller 104 will determine the transmission power in accordance with the conditions shown in FIG. 6. When the altitude information indicates the altitude of the aircraft 1 is 4000 feet or greater, the communication controller 104 uses 10 dBm as the transmission power. In contrast, when the altitude of the aircraft 1 is less than 4000 feet, the communication controller 104 uses 1 dBm as the transmission power.

Accordingly, when the altitude of the aircraft 1 is low and the radio altimeter 2 is operating, the communication apparatus 100 can reduce the effect of interference with the radio altimeter 2 by reducing the transmission power to a low level. In contrast, when the altitude of the aircraft 1 is high and the radio altimeter 2 is not operating, there is no need to consider the effect of interference with the radio altimeter 2, and therefore, the communication apparatus 100 performs communication using a high transmission power. The switching of the transmission power using 4000 feet as the boundary in FIG. 6 is an example in which the altitude at which use of the radio altimeter 2 is to be stopped is 4000 feet. The boundary value for the transmission power switching may be a value in accordance with the type of a radio altimeter being used or an actual operation. The value of transmission power is also exemplary and may be another value.

The communication controller 104 transmits transmission data to the encoder 105. The encoder 105 performs an encoding process on the transmission data in accordance with the parameters defined by the communication controller 104 and creates encoded data. The transmitter 106 modulates the encoded data and transmits the data from the antenna 111. At this time, the transmission power controller 108 performs control such that the transmission power of the transmission signal to be transmitted from the transmitter 106 is equal to the transmission power value determined by the communication controller 104.

The present embodiment has described the communication controller 104 using two transmission power values in accordance with the altitude information, but the number of the power is not necessarily limited thereto. Three or more transmission power values may be used. For example, as shown in FIG. 7, the communication controller 104 may use a determination method in which the transmission power of the communication apparatus 100 increases as the altitude indicated by the altitude information decreases while the radio altimeter 2 is operating.

Since the receiver 4 of the radio altimeter 2 shown in FIG. 3 receives radio waves transmitted by the transmitter 3 and reflected by the ground surface, the reception power of the radio altimeter 2 is generally higher at lower altitudes. For that reason, when a SIR (signal-to-interference power ratio) that does not affect the operation of the radio altimeter 2 is made constant regardless of the altitude, higher interference power is acceptable at lower altitudes.

Note that in the present embodiment, while the altitude information acquisition unit 107 was described as acquiring altitude information of the aircraft 1, the altitude information may be a value expressing the actual altitude, or may be a value obtained by encoding the altitude value. For example, even in the case of the altitude information being expressed by binary symbols, it is possible to achieve the effect of the present invention.

In the present embodiment, the communication controller 104 was described as performing control that determines the transmission power in accordance with the altitude information, but the communication controller 104 may also perform control to determine a modulation coding scheme (MCS) in accordance with the transmission power. In this case, when the altitude of the aircraft is high so that interference with the radio altimeter 2 is not a problem, the communication controller 104 determines a high transmission power and selects an MCS with many modulation levels and a high encoding rate. In contrast, when the altitude of the aircraft 1 is low and interference with the radio altimeter could occur, the communication controller 104 determines a low transmission power and selects an MCS with few modulation levels and a lower encoding rate. As a result, the communication apparatus 100, even with low transmission power, can lower the MCS so as to achieve communication with a low bit error probability.

In addition, as a method of controlling the transmission power, the communication controller 104 may adopt a process that spreads the transmission signal and lowers the transmission power per unit frequency. In this case, the transmitter 106 may generate a spread spectrum signal by performing a spreading process when performing the modulation processing of the encoded data, and transmit the signal from the antenna 111. As a result, it is possible to lower the interference power at the frequency being used by the radio altimeter 2.

As described above, the communication apparatus 100 according to the present disclosure can operate such that the SI ratio, which is a ratio between reception power of the radio altimeter 2 and interference power from the communication apparatus 100, can be a sufficiently high value that does not affect the operation of the radio altimeter 2. Therefore, the communication by the communication apparatus 100 can suppress interference with the radio altimeter 2 and can be used even in the frequency band used by the radio altimeter 2.

Embodiment 2

When the radio altimeter 2 is transmitting a signal using a frequency in certain frequency channels, the communication apparatus 200 according to the present embodiment executes communication control so that the communication does not use a frequency in the frequency channels.

Figure 9:
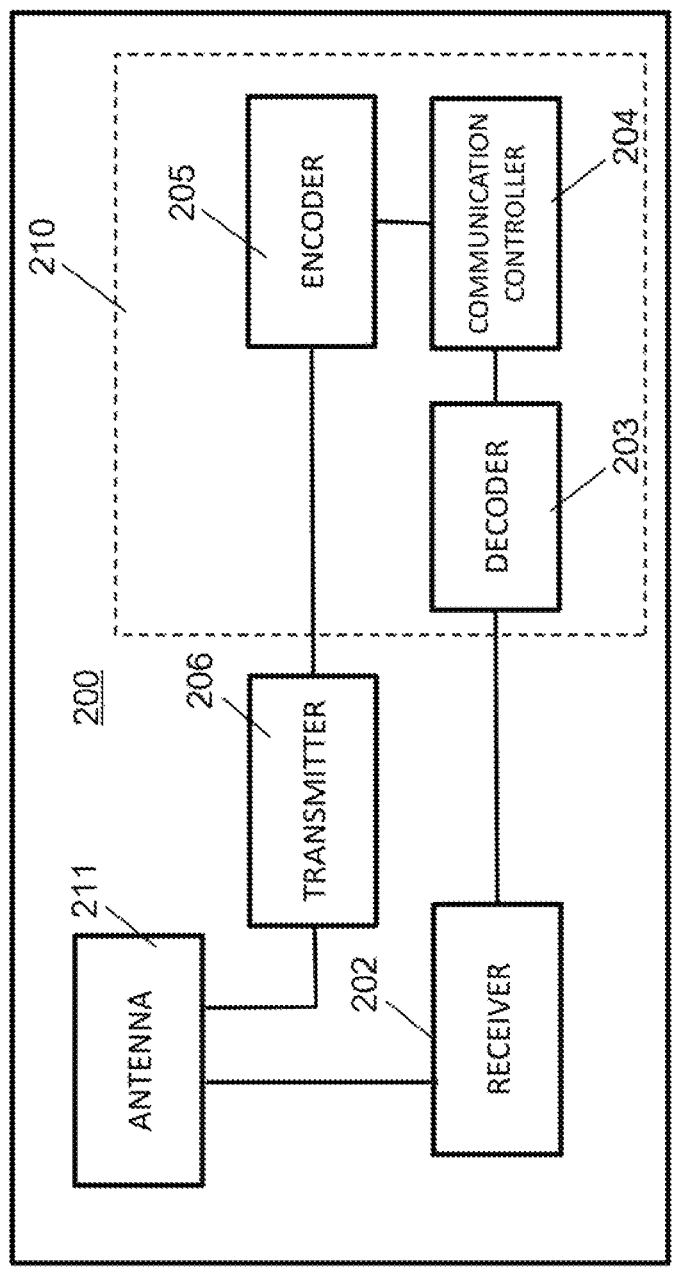
FIG. 9 shows a configuration of a communication apparatus according to Embodiment 2.

FIG. 9 shows the configuration of a communication apparatus 200 according to this embodiment. The communication apparatus 200 comprises an antenna 211, a receiver 202, a decoder 203, a communication controller 204, an encoder 205, and a transmitter 206.

The communication apparatus 200 transmits a signal received by the antenna 211 to the receiver 202. The receiver 202 performs reception processing and transmits the received signal, which has been digitized, to the decoder 203.

The communication apparatus 200 includes a processor 110 including electronic circuitry such as a CPU. The processor 210 executes the functions of the decoder 203, the communication controller 204, and the encoder 205 by performing control and calculation according to a predetermined algorithm.

The decoder 203 decodes the received signal to extract reception data. The communication controller 204 reads a destination address included in the reception data, and when the reception data is addressed to the communication apparatus itself, performs processing of the reception data.

During a transmission operation, the communication controller 204 controls a transmission timing so as to transmit transmission data at a timing when the radio altimeter 2 is not using the frequency channel currently used by the communication apparatus 200. When the transmission is possible, the communication controller 204 transmits the transmission data to the encoder 205. The encoder 205 encodes the transmission data. The transmitter 206 modulates the encoded transmission data to generate a transmission signal, and transmits the transmission signal to the antenna 211.

Next, a method in which the communication apparatus 200 estimates the timing at which the radio altimeter 2 uses the corresponding frequency channel will be discussed.

Figure 10:
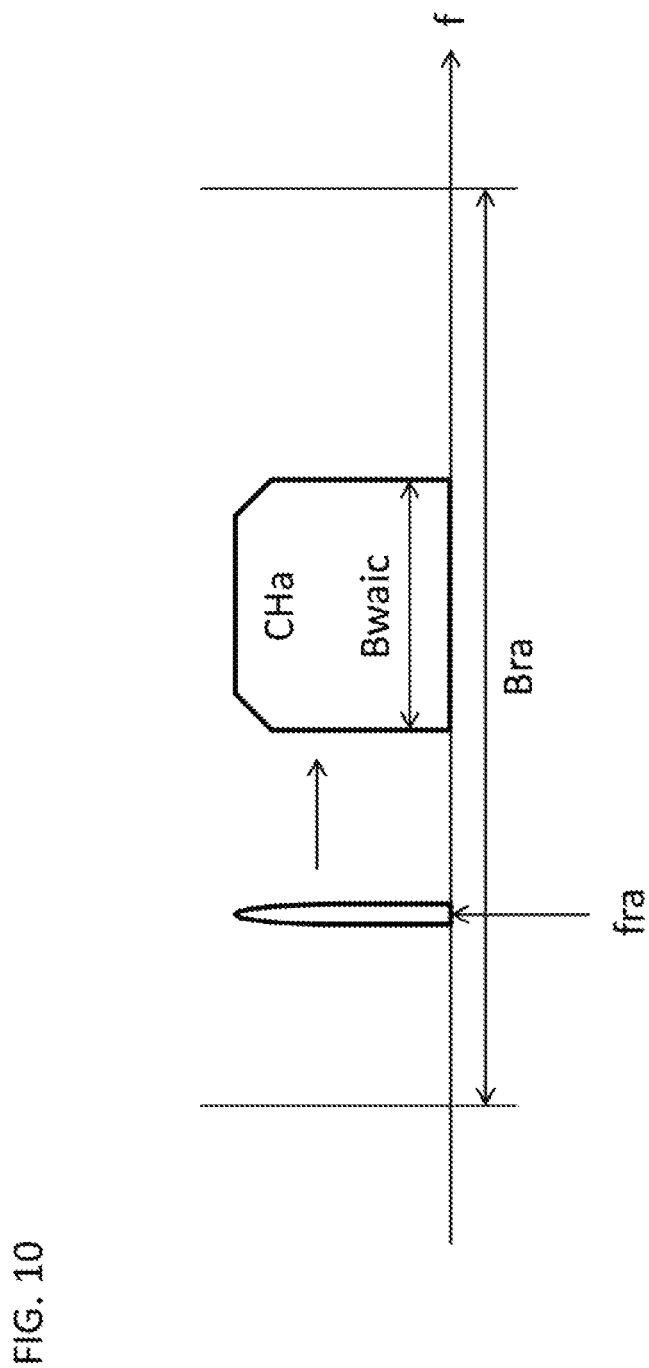
FIG. 10 shows a relationship between the transmission frequency of a radio altimeter and the bandwidth of a communication apparatus.

As shown in FIG. 10, it is assumed that the communication apparatus 200 uses the frequency channel CHa in the bandwidth Bwaic. The transmission frequency fra of the radio altimeter 2 has been repeatedly swept from the lower limit to the upper limit of the frequency bandwidth Bra of the radio altimeter 2. In FIG. 10, the transmission frequency fra of the radio altimeter 2 is outside the frequency channel CHa which is being used by the communication apparatus 200.

The communication apparatus 200 performs carrier sense. When a signal from another communication apparatus is not received, a received signal (carrier) is not observed in the receiver 202 of the communication apparatus 200.

Figure 11:
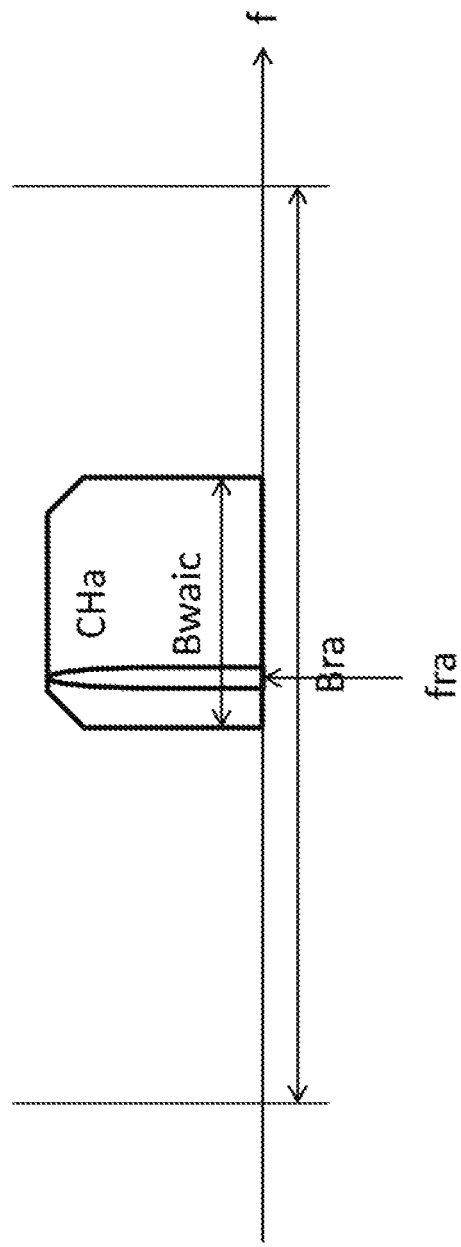
FIG. 11 shows a relationship between the transmission frequency of a radio altimeter and the bandwidth of a communication apparatus.

Next, as shown in FIG. 11, when the transmission frequency fra of the radio altimeter 2 is in the frequency channel CHa of the communication apparatus 200, the transmission signal of the radio altimeter 2 appears in the receiver 202 of the communication apparatus 200.

Figure 12:
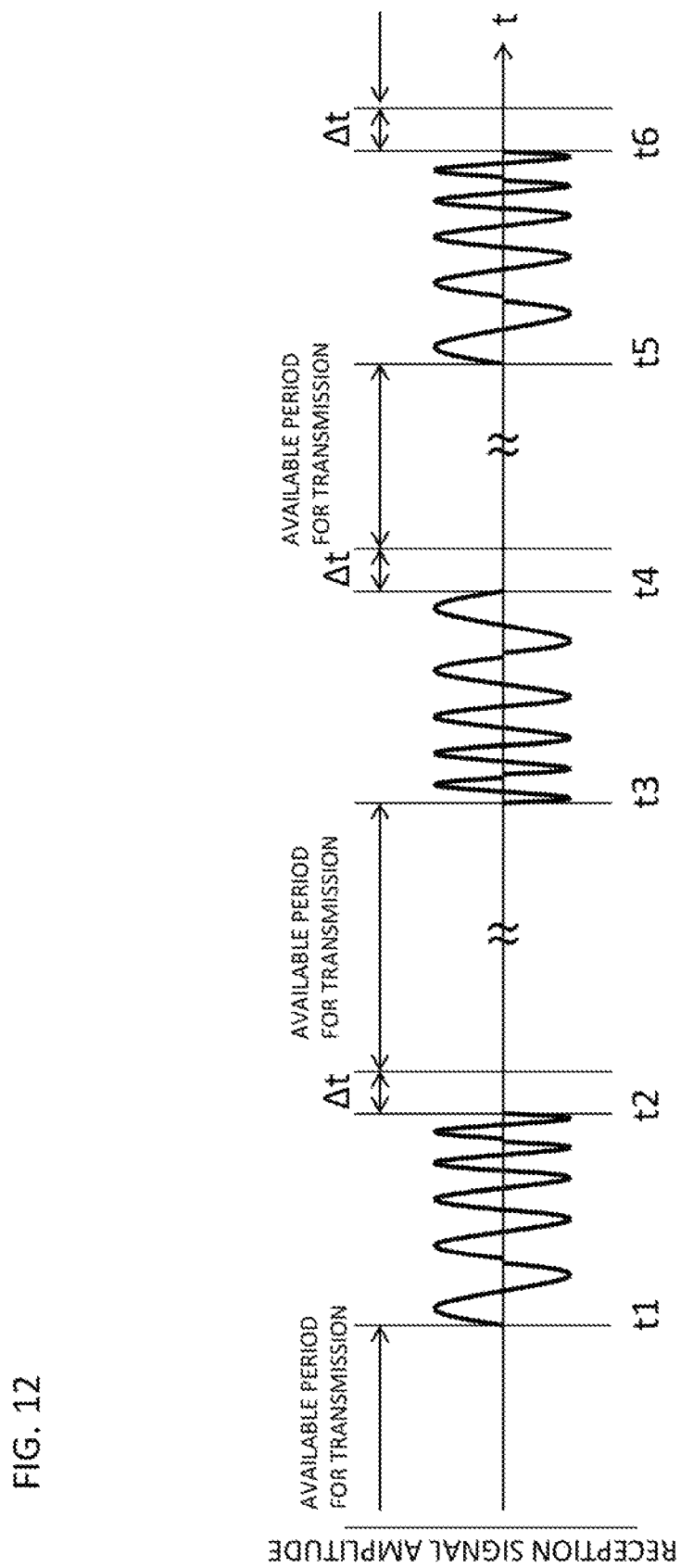
FIG. 12 shows a received signal of a communication apparatus with respect to the time axis.

FIG. 12 shows a state of the received signal of the communication apparatus 200 with respect to time. In FIG. 12, the period from time t1 to t2 is the time during which the frequency fra of the transmission signal of the radio altimeter 2 is in the frequency channel CHa. The received signal is observed at the receiver 202 of the communication apparatus 200. The same applies between time t3 and time t4 and between time t5 and time t6.

Here, the communication apparatus 200 can estimate the frequency sweep period of the radio altimeter 2 by observing the time interval at which the waveform appears in the reception waveform at the receiver 202. Based on this period, the communication controller 204 of the communication apparatus 200 estimates the timing when the transmission signal of the radio altimeter 2 is not using the frequency in the frequency channel CHa, that is, the timing when no interference is given to the radio altimeter 2, and transmits the transmission data at that timing.

The interference with the radio altimeter 2 occurs in the receiver 4 (FIG. 3) of the radio altimeter 2. Therefore, the time in which no interference with the radio altimeter 2 occurs can be assumed to follow the time difference Δt added to the time when the signal transmitted from the radio altimeter 2 does not appear at the receiver 202 of the communication apparatus 200, the time difference Δt being from when the signal is transmitted from the transmitter 3 of the radio altimeter 2 to when the signal reaches the receiver 4 after reflected by the ground surface. The Δt varies depending on a navigation altitude of aircraft. Therefore, the communication controller 204 may use the time difference Δt at the highest altitude when the radio altimeter 2 can be used, or the time difference Δt at the highest altitude when measurement by the radio altimeter 2 is guaranteed. Accordingly, the interference with the radio altimeter 2 can be avoided without depending on the altitude.

Note that the communication apparatus 200 transmits transmission data in frames, which is an example of a unit length of transmission data, as shown in FIG. 13. The time for transmission of a transmission frame by the communication apparatus 200 may be taken longer than a time from the current time to the time t1 when the radio altimeter 2 uses Cha for its next transmission. If this is expected, the communication controller 204 of the communication apparatus 200 may divide the transmission data to produce two transmission frames.

Figure 14:
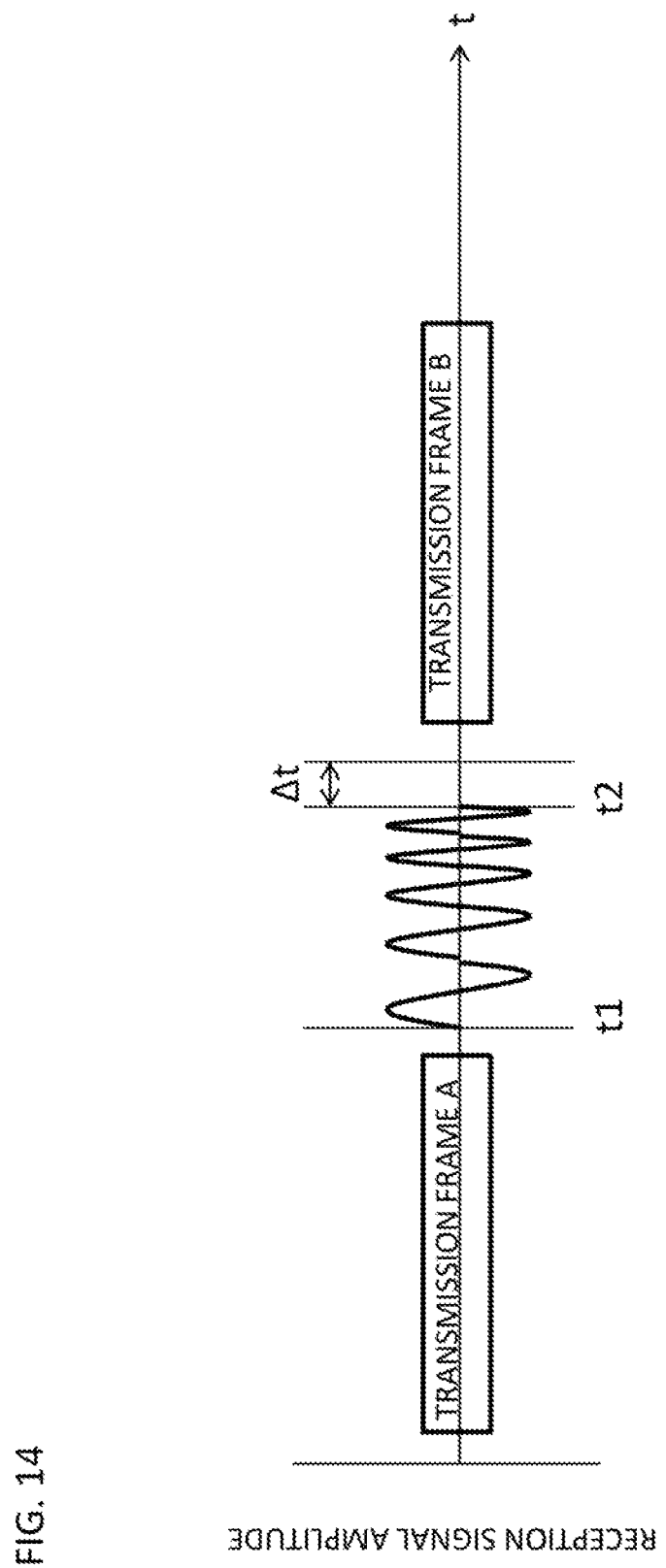
FIG. 14 shows a state of transmission frames transmitted from a communication apparatus.

The communication controller 204 sets the length of the transmission frame A shown in FIG. 14 to a length that allows transmission to be completed between the current time and the time t1. The communication apparatus 200 transmits the transmission frame B after the radio altimeter 2 starts not to use a frequency in the CHa for its transmission signal. In this way, even when the size of the transmission data is large, the transmission data can be sent without causing interference with the radio altimeter 2.

Although the case where the transmission frame is divided into two has been described above, the present disclosure is not limited thereto. The effect of the present disclosure can be obtained even when the transmission frame is divided into three or more, or even when the transmission interval between the divided transmission frames is widened.

In a case where the communication apparatus 200 divides the transmission frame into two or more, if another communication apparatus that has received the transmission frame A transmits an ACK frame, this could cause interference with the radio altimeter 2. In such a case, the communication apparatus 200 may use the block ACK function, by which ACK for a plurality of data is collectively returned, thereby preventing another communication apparatus from transmitting an ACK frame after the transmission of the transmission frame A.

Embodiment 3

The communication apparatus 300 according to this embodiment performs communication using a frequency band other than the frequency band which is being used by the radio altimeter 2.

Figure 15:
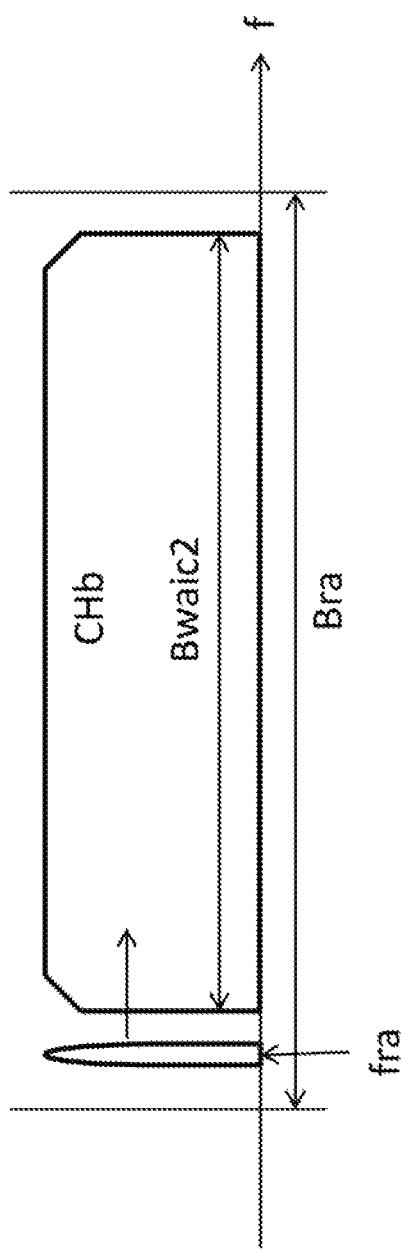
FIG. 15 shows a relationship between the transmission frequency of a radio altimeter and the bandwidth of a communication apparatus.
Figure 16:
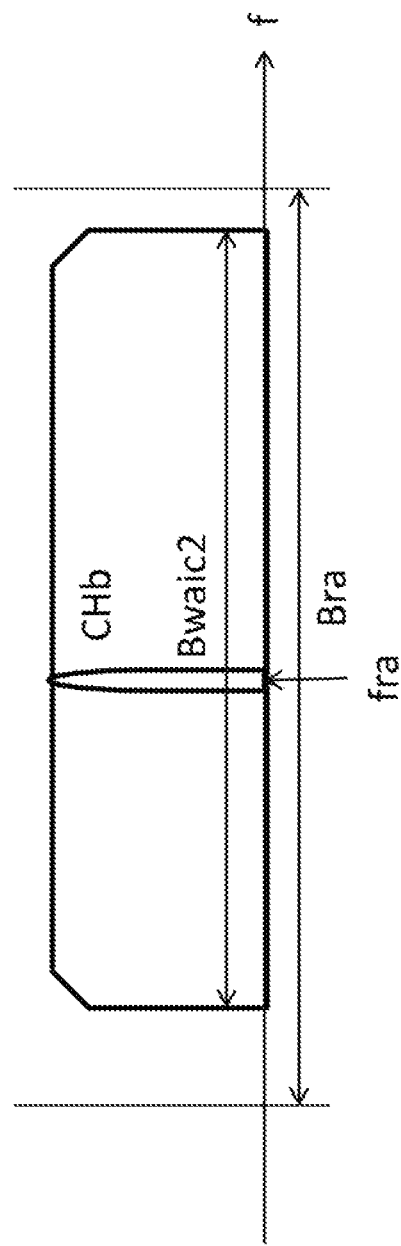
FIG. 16 shows a relationship between the transmission frequency of a radio altimeter and the bandwidth of a communication apparatus.

Here, a communication apparatus that performs broadband transmission is taken into consideration. For example, in the case of the communication apparatus 200 of Embodiment 2, when the bandwidth used by the communication apparatus is equal to or wider than the bandwidth used by the radio altimeter 2, there is no time in which the communication apparatus can transmit a signal because the receiver 202 keeps detecting the transmission frequency fra of the radio altimeter. Further, as shown in FIG. 15 and FIG. 16, even when the bandwidth CHb used by the communication apparatus is narrower than the bandwidth Bra used by the radio altimeter 2, if the major parts thereof overlap, there arises a problem that the time during which the communication apparatus can transmit a signal is reduced. Accordingly, this embodiment describes a communication apparatus that can operate even in such a state.

Figure 17:
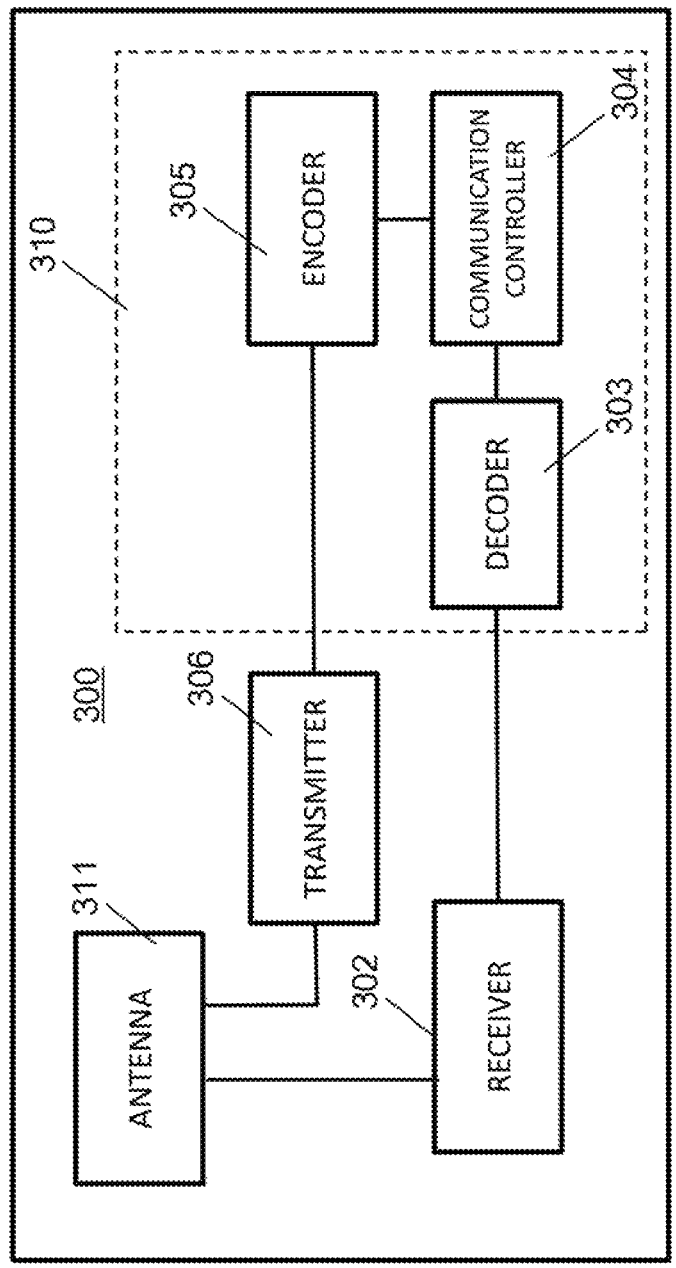
FIG. 17 shows a configuration of a communication apparatus according to Embodiment 3.

FIG. 17 shows a communication apparatus 300 of this embodiment. The communication apparatus 300 has a similar configuration as the communication apparatus 200 of Embodiment 2 and includes an antenna 311, a receiver 302, a decoder 303, a communication controller 304, an encoder 305, and a transmitter 306.

The communication apparatus 300 includes a processor 310 including electronic circuitry such as a CPU. The processor 310 executes the functions of the decoder 303, the communication controller 304, and the encoder 305 by performing control and calculation according to a predetermined algorithm.

Figure 18:
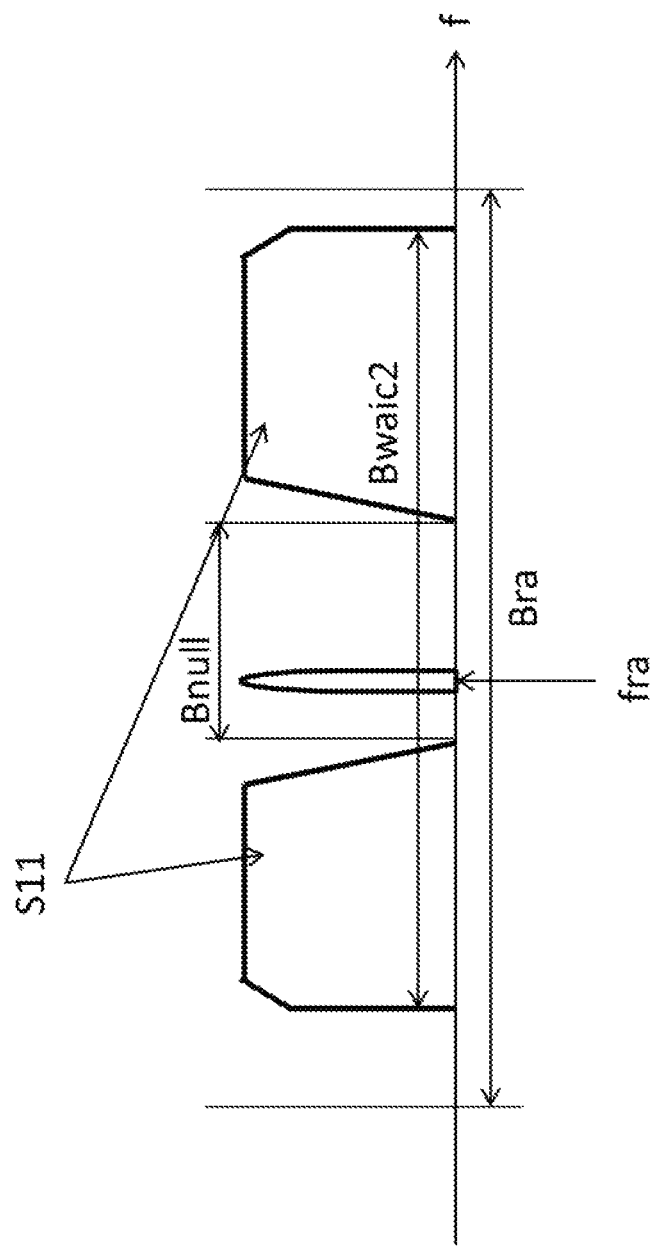
FIG. 18 shows a relationship between the transmission frequency of a radio altimeter and the bandwidth of a communication apparatus.

In particular, the communication apparatus 300 transmits a signal having a spectrum S11 shown in FIG. 18 in order to avoid interference with the radio altimeter 2. As shown in FIG. 18, the spectrum S11 includes a spectrum notch having a bandwidth of Bnull including the frequency fra used by the radio altimeter 2. Here, the communication controller 304 in the communication apparatus 300 sets the bandwidth Bnull of the spectrum notch so as to satisfy the following criteria.

A beat frequency corresponding to the maximum measurable altitude Hmax supported by the radio altimeter 2 is referred to as fbmax, and the bandwidth of the reception LPF of the radio altimeter 2 is referred to as Bldf.

Figure 19:
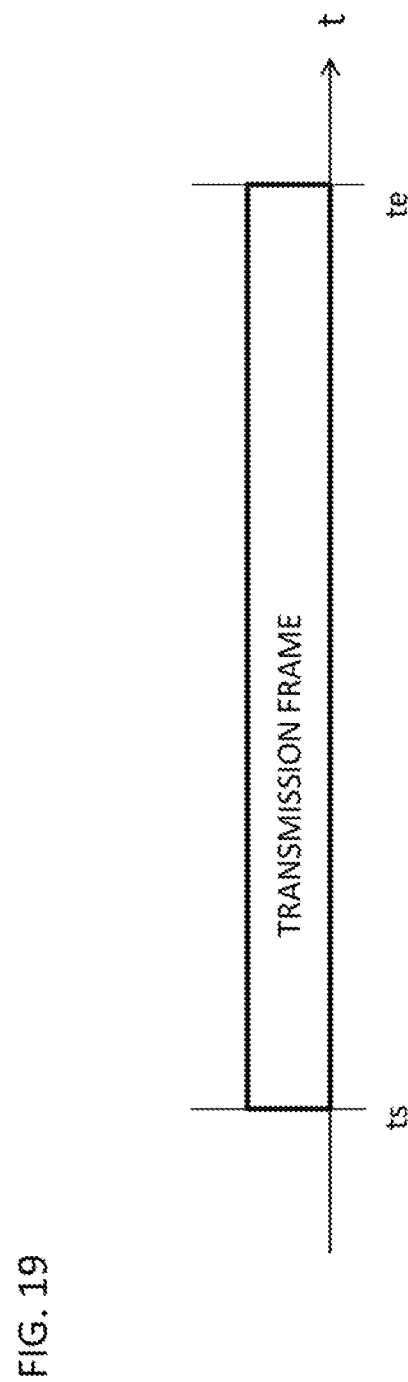
FIG. 19 shows a transmission frame transmitted from a communication apparatus.
Figure 20:
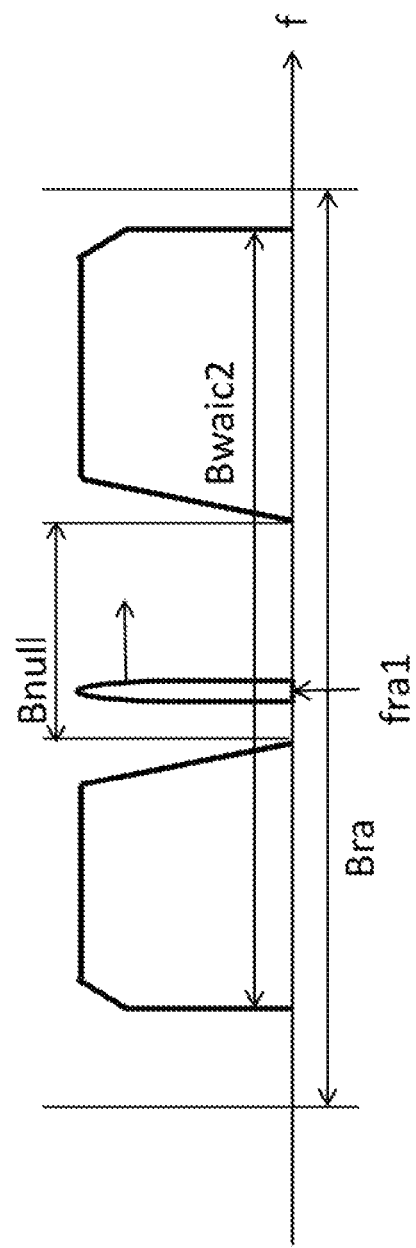
FIG. 20 shows a relationship between the transmission frequency of a radio altimeter and the bandwidth of a communication apparatus.
Figure 21:
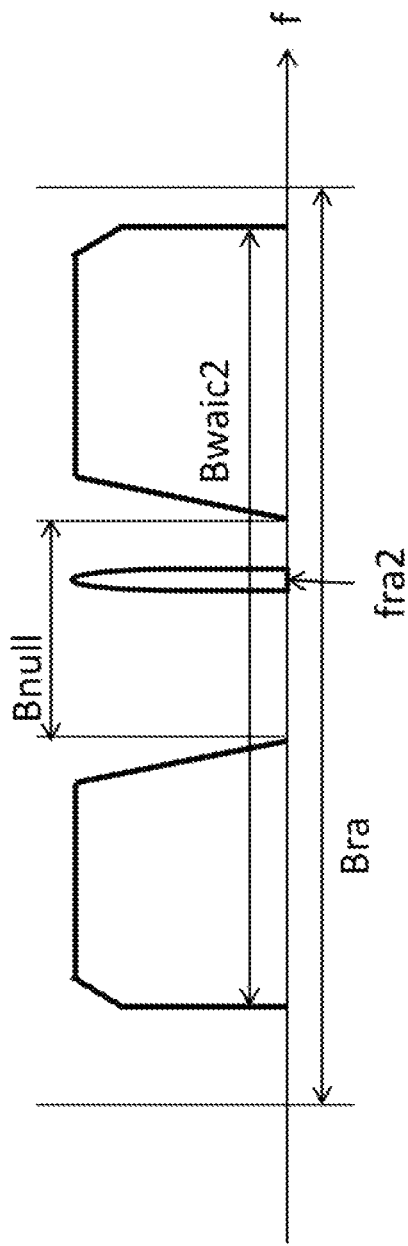
FIG. 21 shows a relationship between the transmission frequency of a radio altimeter and the bandwidth of a communication apparatus.
Figure 22:
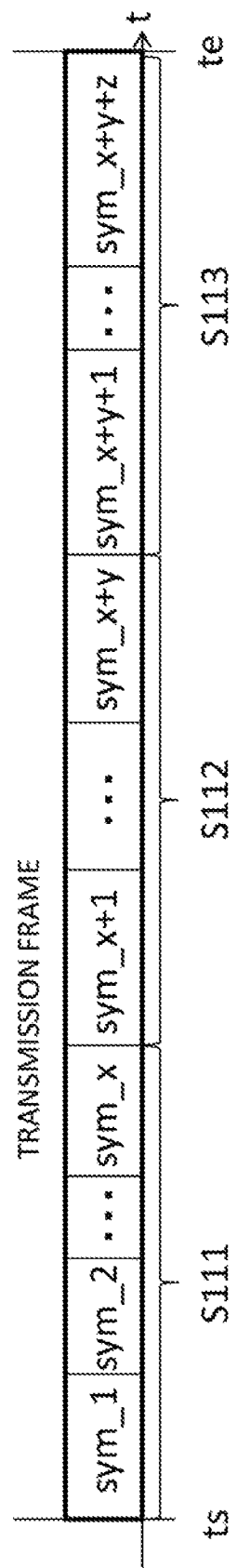
FIG. 22 shows an example of a transmission frame.
Figure 23:
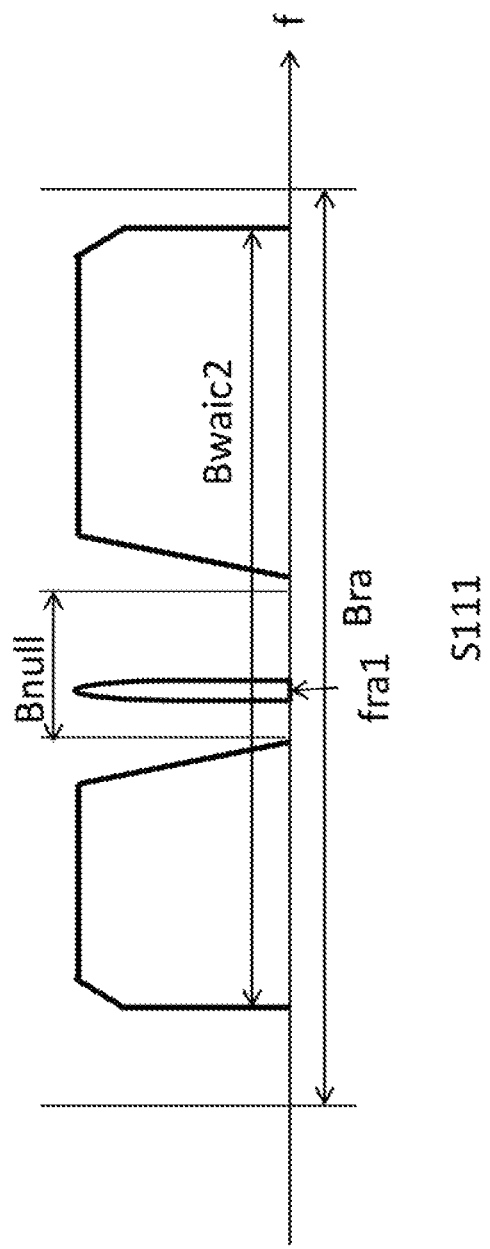
FIG. 23 shows a relationship between the transmission frequency of a radio altimeter and the bandwidth of a communication apparatus.
Figure 24:
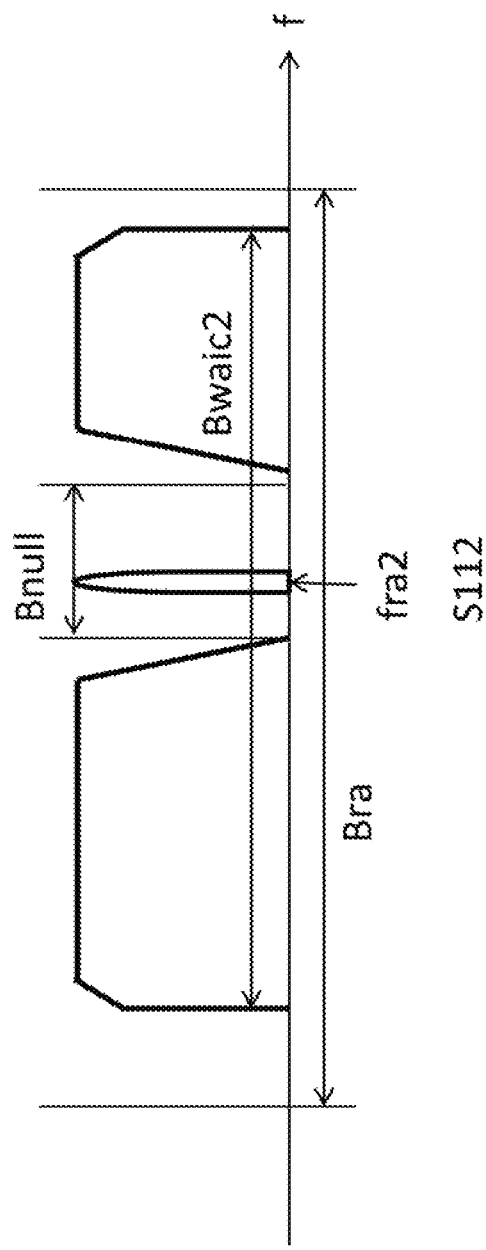
FIG. 24 shows a relationship between the transmission frequency of a radio altimeter and the bandwidth of a communication apparatus.
Figure 25:
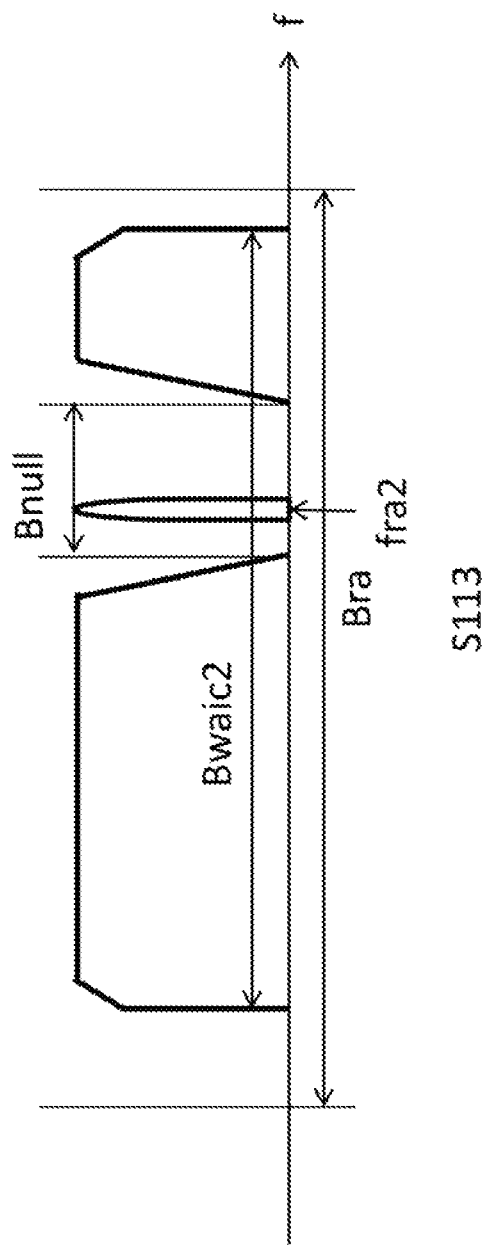
FIG. 25 shows a relationship between the transmission frequency of a radio altimeter and the bandwidth of a communication apparatus.

As shown in FIG. 19 to FIG. 21, the difference between the transmission frequency fra1 and the transmission frequency fra2 is referred to as fadiff, in which the fra1 is a transmission frequency of the radio altimeter 2 at the transmission start time is of a transmission frame transmitted by the communication apparatus 300 as shown in FIG. 19, and the fra2 is a transmission frequency of the radio altimeter 2 at the transmission end time to of the transmission frame.

By setting the value of Bnull to be a larger than a value found by the formula below, the communication apparatus 300 can transmit a transmission frame without causing interference with the radio altimeter 2.

$$f b\max + Blpf + f a\text{diff} \quad \text{Formula 1:}$$

Further, the communication controller 304 sets the lower limit and upper limit frequencies of Bnull as below.

$$fra1-(fb\max+Blpf) \quad \text{Formula 2:}$$

$$fra2+(fb\max+Blpf) \quad \text{Formula 3:}$$

Note that although the communication controller 304 of this embodiment uses the maximum value fbmax as the beat frequency, the present disclosure is not limited to this. Alternatively, the beat frequency fbnow corresponding to the current altitude of aircraft may be used. By doing so, the communication apparatus 300 can reduce the width of Bnull, and can increase the amount of data that can be transmitted in the transmission frame.

The transmitter 306 in the communication apparatus 300 generates a transmission signal having a spectrum determined by the communication controller 304. The method of generating a transmission signal having a spectrum with a notch may adopt setting subcarriers of a multicarrier signal such as OFDM, which correspond to the Bnull frequency, to zero, applying weight for precoding, or deforming the spectrum by superimposing another delayed transmission signal for a predetermined time.

In the above described embodiment, it has been described that the communication controller 304 nullifies the frequency including the transmission frequency of the radio altimeter 2 when transmission of the transmission frame ends. However, if the transmission frame is long and the difference between the fadiff and the bandwidth Bwaic2 of the communication apparatus 300 gets smaller, it becomes necessary to increase the Bnull, which will cause the bandwidth available for transmission to be narrower. In such a case, the communication controller 304 avoids interference with the radio altimeter 2 by changing the position of the Bnull for each transmission symbol constituting the transmission frame as shown in FIG. 22 to FIG. 25, thereby enabling a long transmission frame to be transmitted.

Embodiment 4

This embodiment describes a communication apparatus that includes an adaptive antenna array that can electrically control directivity, the communication apparatus being configured to perform communication with an antenna directivity pattern that minimizes signal power from the radio altimeter.

Figure 26:
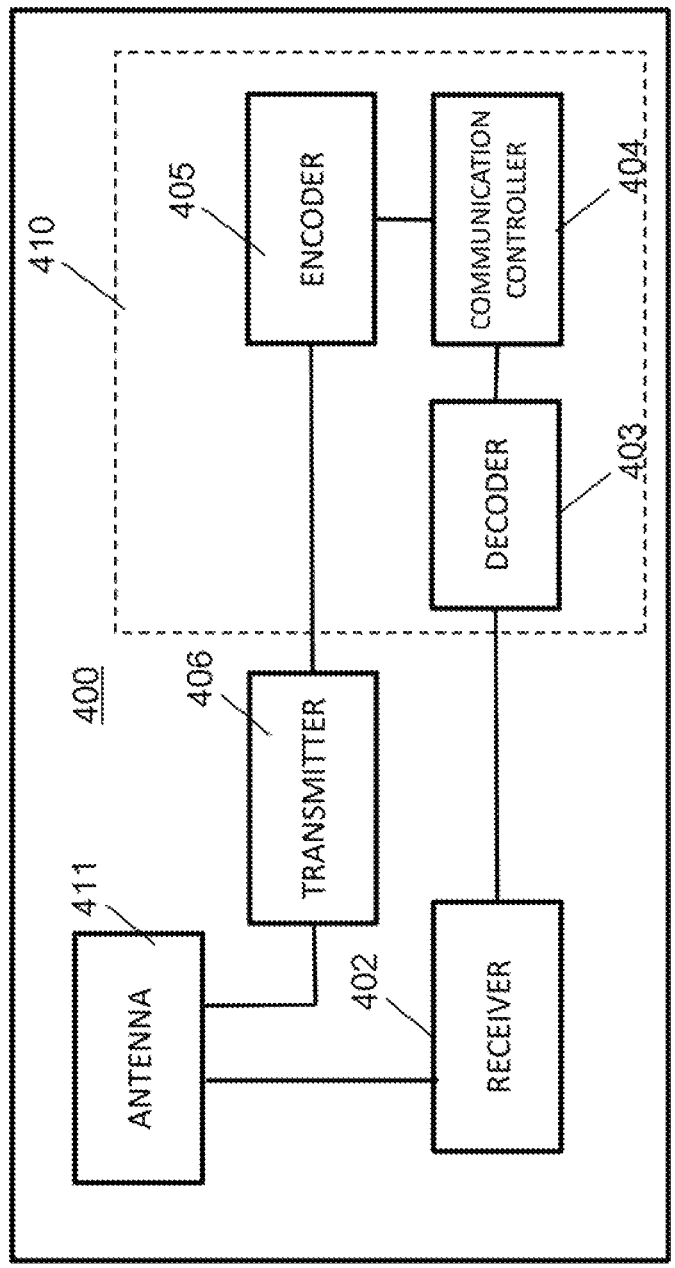
FIG. 26 shows a configuration of a communication apparatus according to Embodiment 4.

FIG. 26 shows a communication apparatus 400 in this embodiment. The communication apparatus 400 comprises an antenna array 411, a receiver 402, a communication controller 404, and a transmitter 406.

The communication apparatus 300 includes a processor 410 including electronic circuitry such as a CPU. The processor 410 executes the functions of the decoder 403, the communication controller 404, and the encoder 405 by performing control and calculation according to a predetermined algorithm.

The antenna array 411 is an antenna array including a plurality of antenna elements. The receiver 402 synthesizes signals obtained by multiplying signals received by the antenna elements of the antenna array 411 with a weight (amplitude change, phase rotation). Here, a method for determining the weight applied by the receiver 402 will be described.

Figure 27:
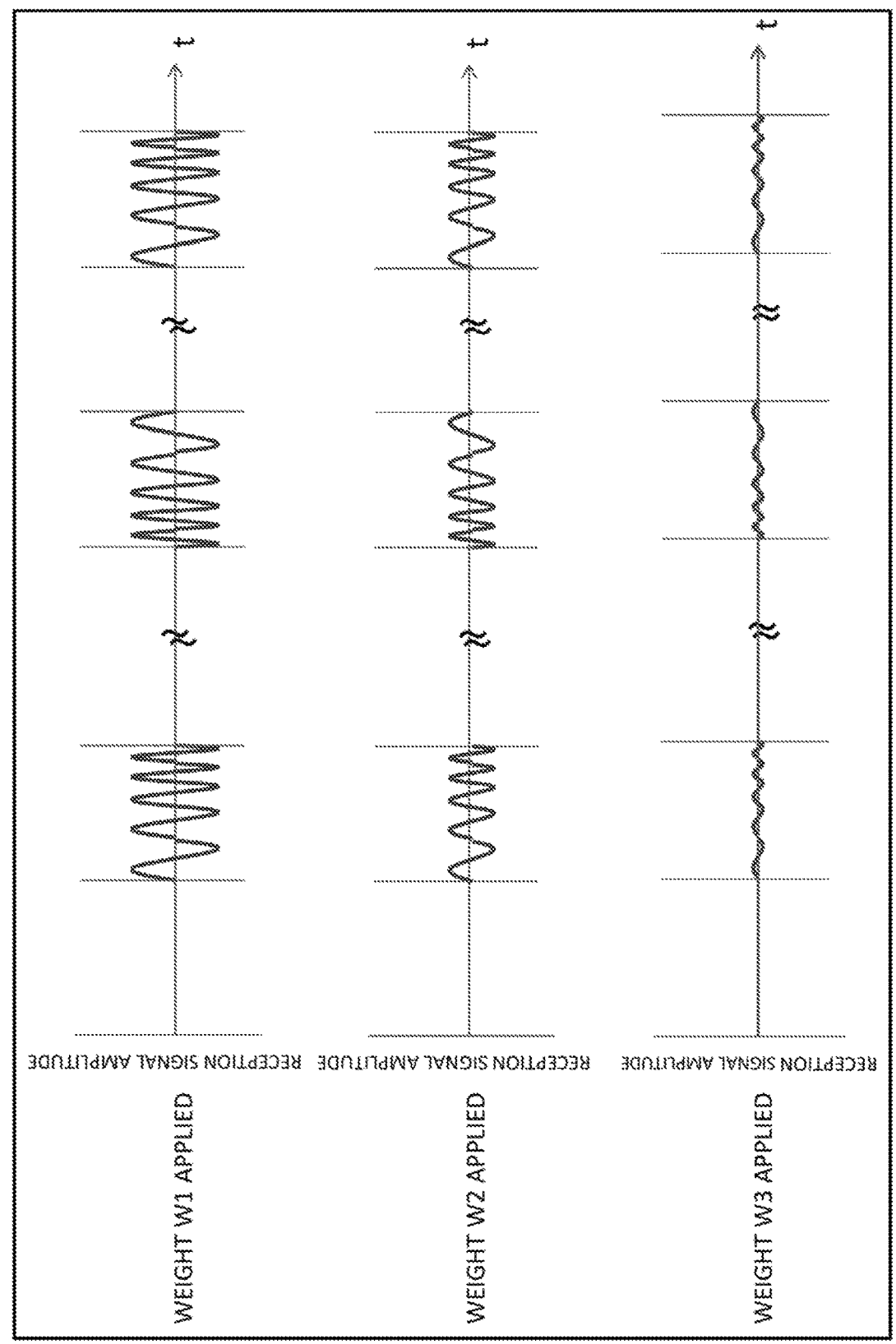
FIG. 27 shows amplitudes of received signals of a radio altimeter when weight is changed.

FIG. 27 shows amplitude of a received signal by the radio altimeter 2 when the receiver 402 changes the weight. FIG. 27 shows an example of amplitude of the received signal when the weight is changed between W1, W2, and W3. By changing the weight, the amplitude of the received signal changes. If a weight pattern that generates the smallest amplitude of the received signal is used, interference with the radio altimeter 2 is minimized.

In addition, when the communication apparatus 400 switches between transmission and reception using time division duplex (TDD), if the weight pattern used for reception is also used for transmission, interference with the radio altimeter 2 can be reduced.

Thus, the communication apparatus 400 of this embodiment changes the weight pattern in the receiver 402 to a weight pattern that minimizes the amplitude of the received signal from the radio altimeter 2, thereby reducing interference to the radio altimeter 2 and from the radio altimeter 2.

Embodiment 5

This embodiment describes a communication apparatus that changes parameters for transmitting a radio signal depending on the altitude of aircraft.

Figure 28:
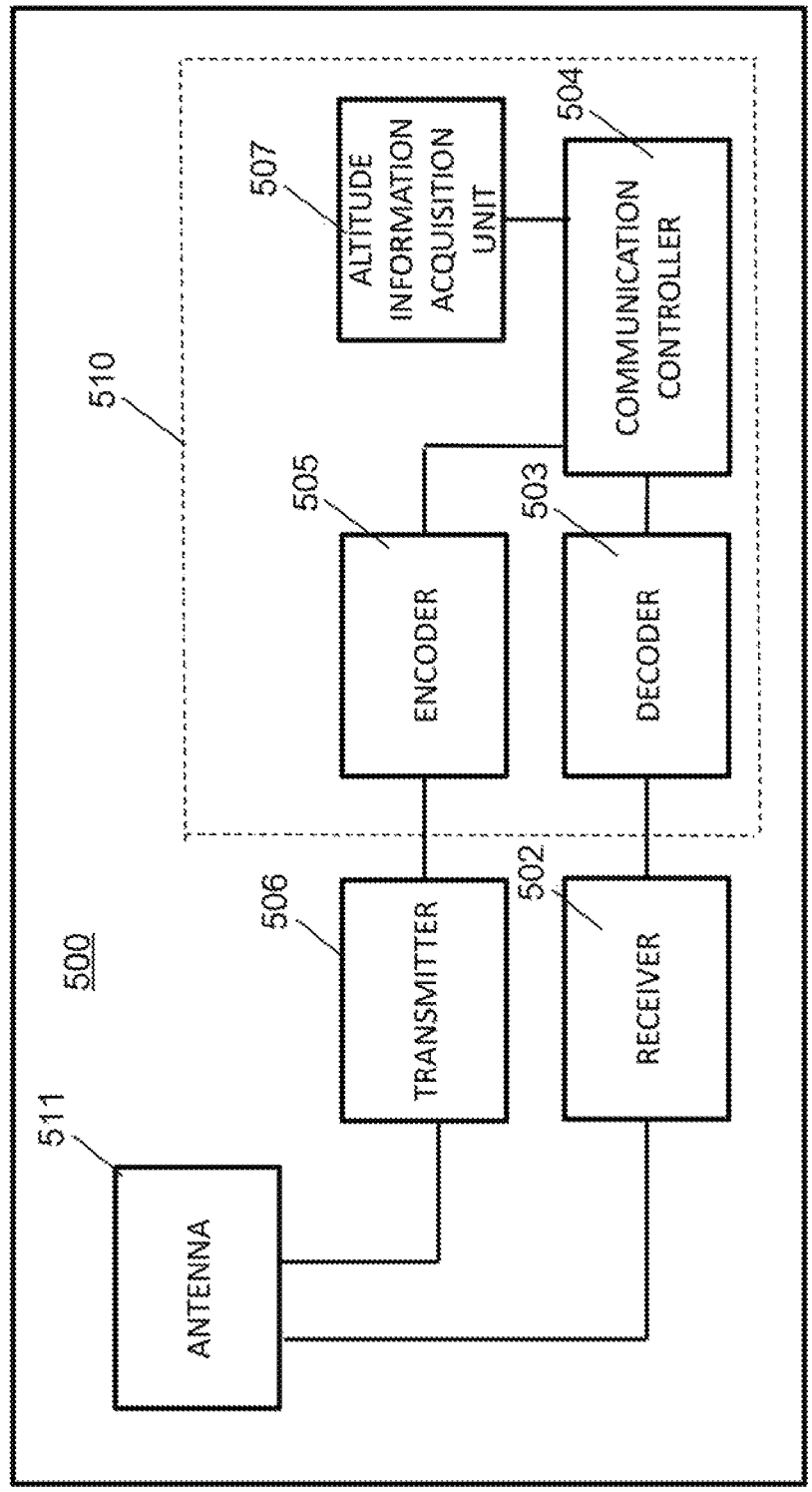
FIG. 28 shows a configuration of a communication apparatus according to Embodiment 5.

FIG. 28 shows the configuration of a communication apparatus 500. The communication apparatus 500 comprises an antenna 511, a receiver 502, a decoder 503, a communication controller 504, an encoder 505, a transmitter 506, and an altitude information acquisition unit 507, similarly to the communication apparatus 100 of Embodiment 1. Likewise the communication apparatus 100 of the Embodiment 1, the communication apparatus 500 includes a processor 510 including electronic circuitry such as a CPU. The processor 510 executes the functions of the decoder 503, the communication controller 504, the encoder 505, and the altitude information acquisition unit 507 by performing control and calculation according to a predetermined algorithm.

When the communication apparatus 500 transmits a signal to another communication apparatus, the communication controller 504 acquires the current altitude information from the altitude information acquisition unit 507. The communication controller 504 determines generation of transmission data and transmission parameters based on the acquired altitude information. The transmission parameters include a coding scheme, a coding rate, a modulation scheme, a bandwidth, precoding information, a used channel, transmission power, and the like. By doing so, even if the aircraft 1 is provided with a radio altimeter 2 that operates differently depending on the altitude, the communication apparatus 500 can use transmission parameters that do not interfere with the radio altimeter 2.

Figure 29:
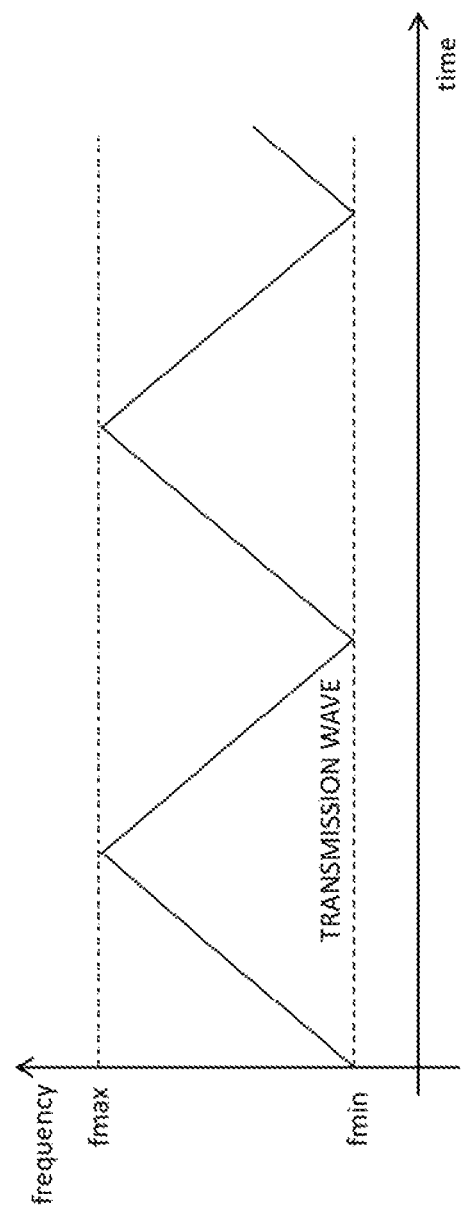
FIG. 29 shows an example of a waveform of a transmission signal from a radio altimeter.
Figure 30:
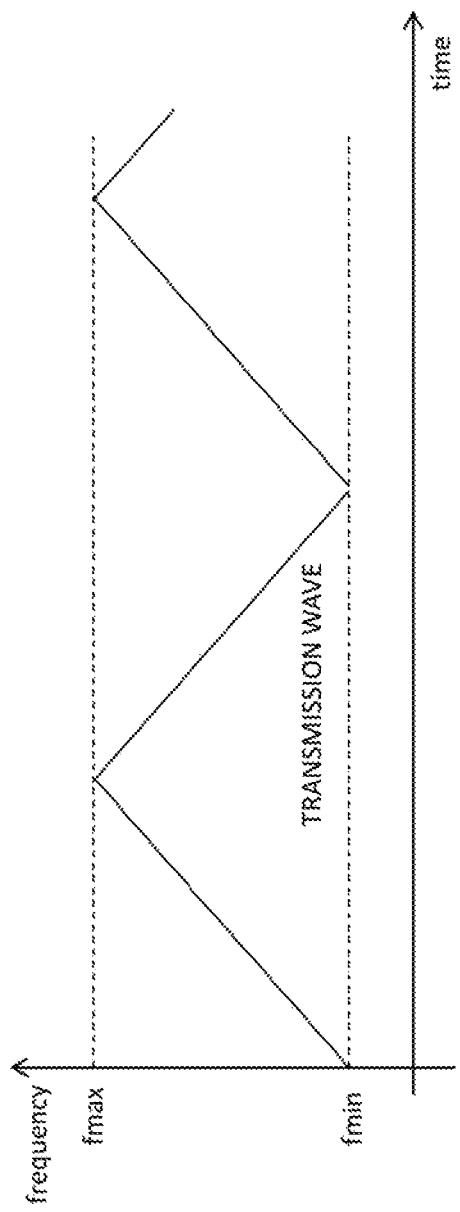
FIG. 30 shows an example of a waveform of a transmission signal from a radio altimeter.
Figure 31:
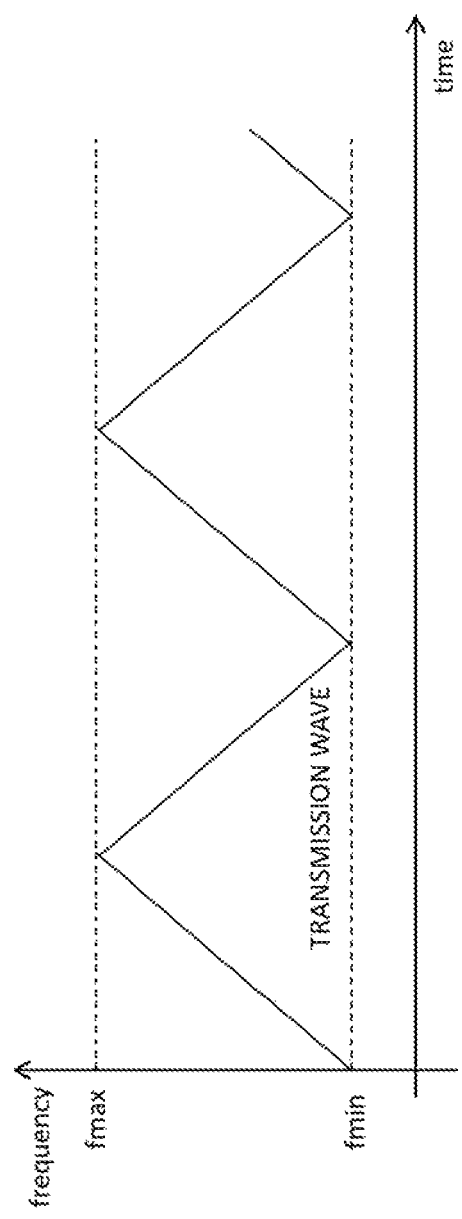
FIG. 31 shows an example of a waveform of a transmission signal from a radio altimeter.
Figure 32:
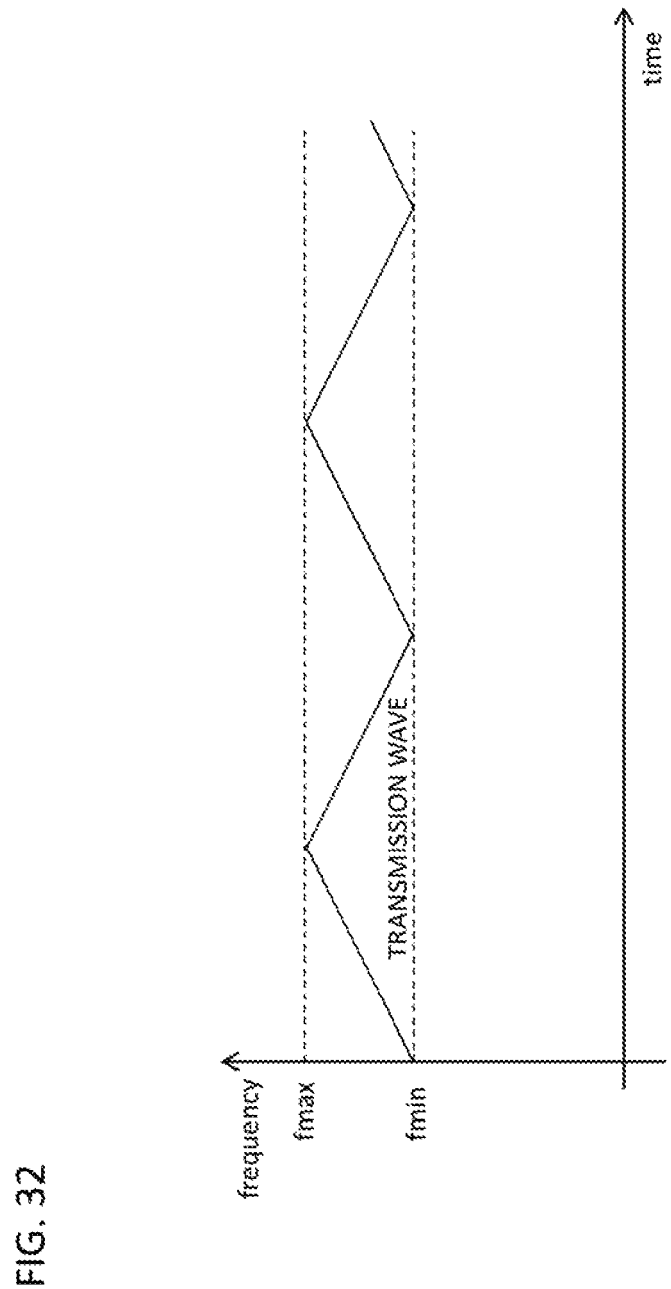
FIG. 32 shows an example of a waveform of a transmission signal of a radio altimeter.

FIG. 29 to FIG. 33 show examples of the waveform of the signal from the radio altimeter 2. FIG. 29 shows a relationship between the time and the transmission frequency of the radio altimeter 2 when the altitude is low, and FIG. 30 shows a relationship between the time and the transmission frequency of the radio altimeter 2 when the altitude is high. When the navigation altitude of the aircraft 1 increases, the radio altimeter 2 changes its operation so as to lower the frequency of the triangle wave to be transmitted, as shown in FIG. 30. The altitude information acquisition unit 507 of the communication apparatus 500 acquires the altitude at which the radio altimeter 2 switches its operation and an operation pattern after the switching. This can be carried out by the communication apparatus 500 storing in advance information on the frequency at which the radio altimeter 2 changes its operation, receiving and observing a transmission signal from the radio altimeter 2, or receiving notification from another communication apparatus that holds information on the frequency of the radio altimeter 2. The altitude information acquisition unit 507 notifies the communication controller 504 of the current altitude, the altitude at which the radio altimeter 2 switches its operation, and the operation pattern. The communication controller 504 determines the transmission parameters of the communication apparatus 500 based on the information received from the altitude information acquisition unit 507. The communication controller 504 transmits transmission data to the encoder 505. The encoder 505 performs encoding processing on the transmission data according to the parameters determined by the communication controller 504, and generates encoded data. The transmitter 506 modulates the encoded data and transmits it from the antenna 511.

Figure 33:
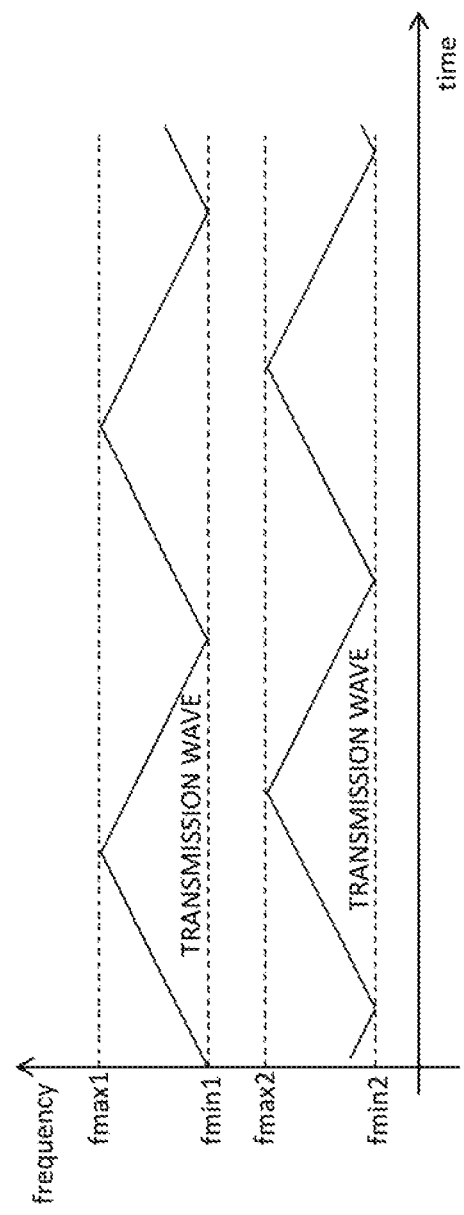
FIG. 33 shows an example of a waveform of transmission signals of a radio altimeter.

This embodiment described an example of the radio altimeter 2 that changes the value of the frequency of the triangular wave according to the altitude, but the present disclosure is not limited to this. For example, the radio altimeter 2 may change the bandwidth swept at the frequency shown in FIG. 31 to the bandwidth shown in FIG. 32, or the radio altimeter 2 may change the number of triangle waves to be transmitted as shown in FIG. 33. Even with these radio altimeters 2, the communication controller 504 can transmit a transmission signal with appropriate transmission parameters in accordance with the change in the operation of the radio altimeter.

Embodiment 6

The present embodiment describes a communication apparatus that performs control of communication conditions such as transmission power in accordance with the location at which the communication apparatus is installed.

Figure 34:
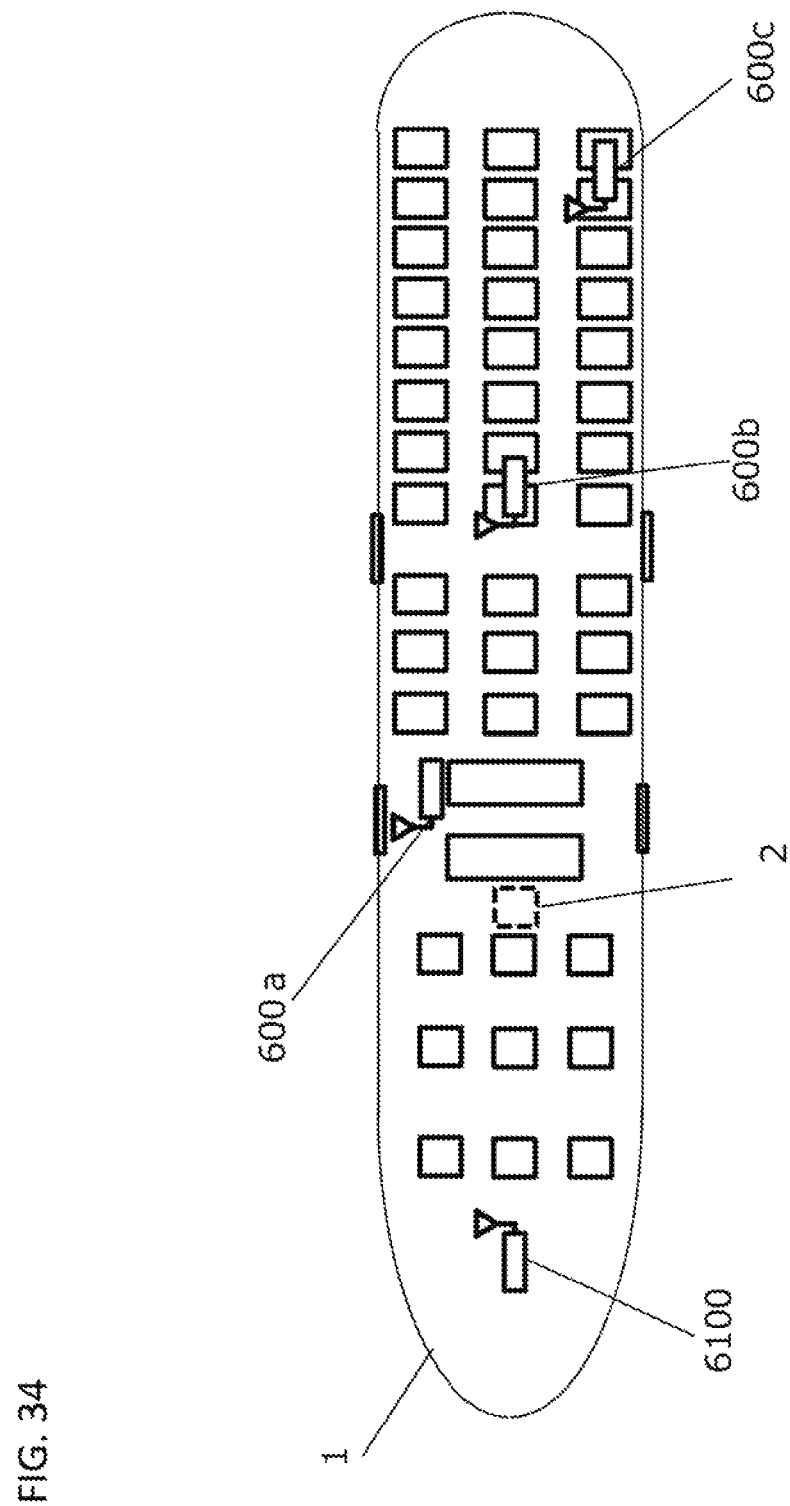
FIG. 34 shows positions of a plurality of communication apparatuses in aircraft.

FIG. 34 shows an example of the positional relation between a plurality of communication apparatuses 600 (600a to 600c) in the aircraft 1. The control apparatus 6100 is a wireless base station, and performs communication with the communication apparatus 600a, the communication apparatus 600b, and the communication apparatus 600c. The control apparatus 6100 controls the communication conditions of communication with each of the communication apparatuses 600a to 600c.

Figure 35:
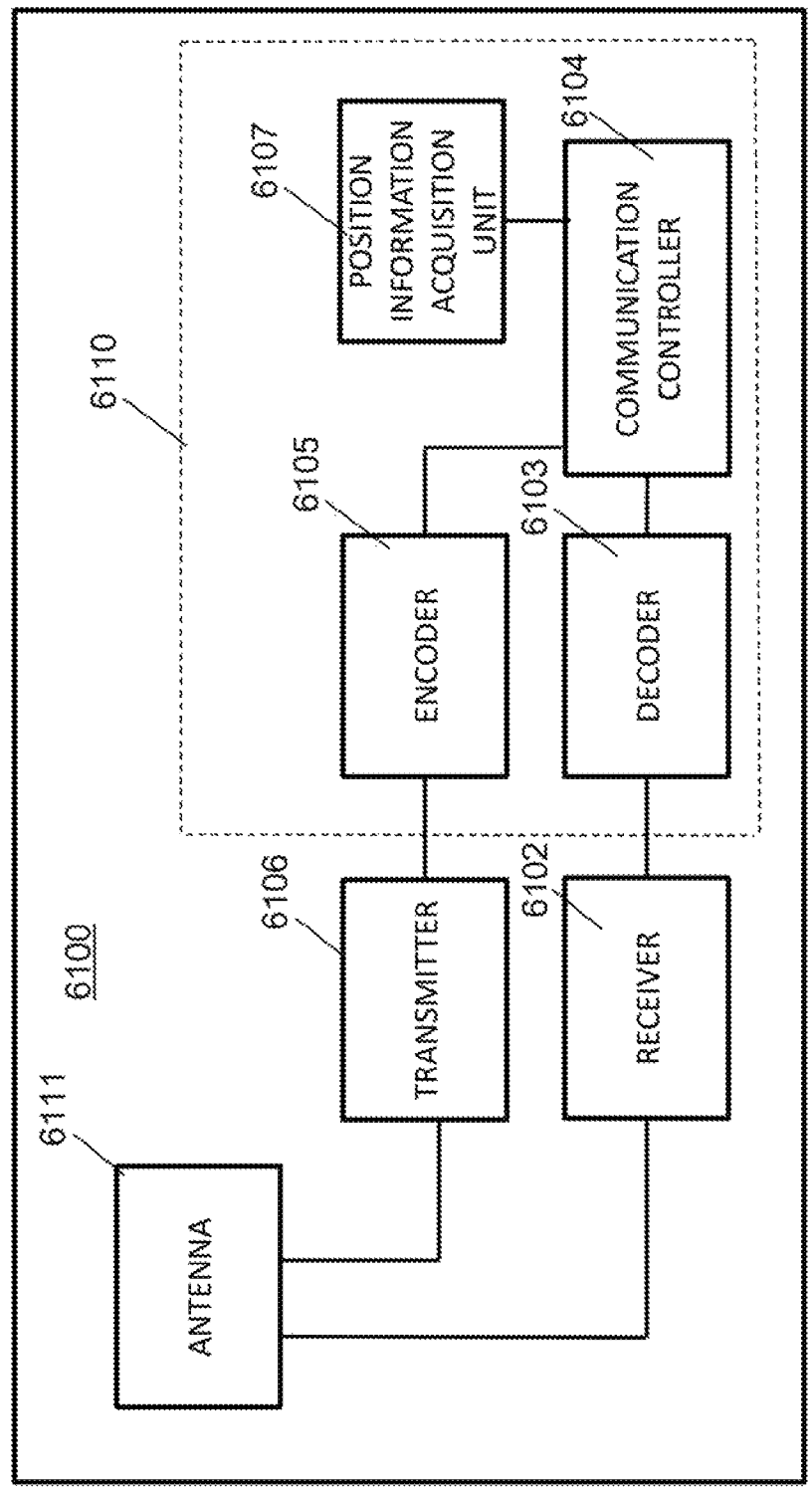
FIG. 35 shows a configuration of a control apparatus according to Embodiment 6.

FIG. 35 shows a configuration of the control apparatus 6100. The control apparatus 6100 comprises an antenna 6111, a receiver 6102, a decoder 6103, a communication controller 6104, a position information acquisition unit 6107, an encoder 6105, and a transmitter 6106. The position information acquisition unit 6107 acquires position information of the radio altimeter 2 and position information where the plurality of communication apparatuses 600a to 600c with which the control apparatus 6100 communicate are installed, and stores the position information in a memory. The position information acquisition unit 6107 can adopt, as means for acquiring the position information of each communication apparatus 600a to 600c, a method of estimating the position from the reception power and transmission path response during communication with each communication apparatus 600a to 600c, or a method of saving a table in which the position of each communication apparatus 600a to 600c is recorded and referring to the table.

Figure 36:
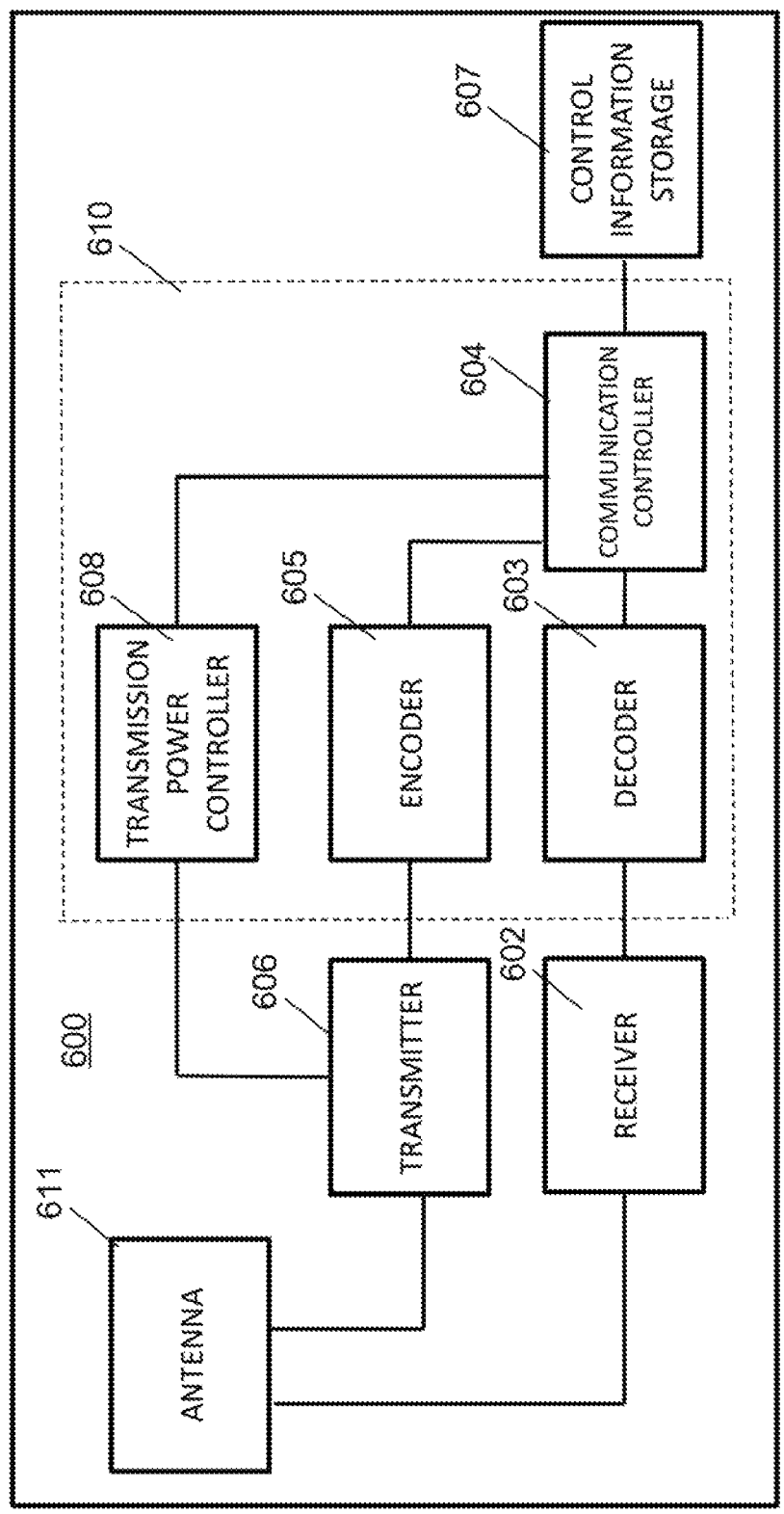
FIG. 36 shows a configuration of a communication apparatus according to Embodiment 6.

FIG. 36 shows the configuration of the communication apparatus 600 (600a to 600c). The communication apparatus 600 comprises an antenna 611, a receiver 602, a decoder 603, a communication controller 604, a control information storage 607, an encoder 605, a transmitter 606, and a transmission power controller 608.

The control information storage 607 is, for example, a memory, and stores control information for communication that is notified from the control apparatus 6100. The communication controller 604 acquires, from the control information storage 607, control information required for transmission and reception of a radio signal.

The communication apparatus 600 includes a processor 610 including electronic circuitry such as a CPU. The processor 610 executes the functions of the decoder 603, the communication controller 604, the encoder 605, and the transmission power controller 608 by performing control and calculation according to a predetermined algorithm.

The communication procedure of the control apparatus 6100 and the communication apparatus 600 will be described. In this example, the radio altimeter 2 is installed at an external front bottom portion of the fuselage of aircraft. The position information acquisition unit 6107 of the control apparatus 6100 is assumed to acquire the position information of the communication apparatus 600a, the communication apparatus 600b, and the communication apparatus 600c. The radio altimeter 2 is installed at the front bottom portion of the fuselage of aircraft, and therefore, the effect of interference with the radio altimeter is great at the communication apparatus 600a installed at a window side in the front of the fuselage, and smaller at the communication apparatus 600b installed in a central portion of the fuselage and at the communication apparatus 600c installed at a window side in the rear of the fuselage. When the control apparatus 6100 performs communication with the communication apparatus 600a, the position information acquisition unit 6107 of the control apparatus 6100 acquires the position information of the communication apparatus 600a and transmits the position information to the communication controller 6104. The communication controller 6104 determines, on the basis of the position information of the communication apparatus 600a, a communication condition to be used by the communication apparatus 600a for communication. In this example, since the communication apparatus 600a is positioned at a window side in the front of the fuselage where there is risk of causing interference with the radio altimeter 2, the communication controller sets a condition of using a low transmission power, and creates transmission data for notifying the communication apparatus 600a of that condition. The communication controller 6104 transmits the transmission data to the encoder 6105. The encoder 6105 encodes the transmission data, and transmits the encoded data to the transmitter 6106. The transmitter 6106, after modulating the encoded data into a form that can be transmitted by a radio signal, transmits the signal from the antenna 6111.

The communication apparatus 600a receives the signal from the control apparatus 6100 via the antenna 611. The receiver 602 demodulates the received signal and creates demodulation data. The decoder 603 decodes digitalized demodulation data to obtain reception data. The communication controller 604 decodes the reception data, obtains the communication condition notified from the control apparatus 6100, and stores the communication condition in the control information storage 607. In this case, the condition of low transmission power is saved. When the communication apparatus 600a transmits a signal to the control apparatus 6100 or another communication apparatus, the communication controller 604 reads the communication condition stored in the control information storage 607 and determines transmission parameters that conform to that condition. The communication controller 604 transmits transmission data to the encoder 605. The encoder 605 creates encoded data in accordance with the determined transmission parameters. The transmitter 606 modulates the encoded data in accordance with the determined transmission parameters, and converts it into a form transmittable as a radio signal. At this time, the transmission power controller 608 controls the transmission power of the radio signal in accordance with the transmission parameters determined by the communication controller 604. In this case, the transmission power controller 608 makes the transmission power lower than a predetermined value.

On the other hand, when performing communication with the communication apparatus 600b, the communication controller 6104 of the control apparatus 6100 determines the effect of interference with the radio altimeter 2 by the communication apparatus 600b to be small on the basis of the position information of the communication apparatus 600b. Based on this determination, the communication controller 6104 sets a condition of using a high transmission power as the communication condition to be used by the communication apparatus 600b for communication, and creates transmission data for notifying the communication apparatus 600b of that condition. The communication apparatus 600b, having received the transmission data from the control apparatus 6100, stores the communication condition received from the control apparatus 6100 in the control information storage 607. In this case, the control information storage 607 saves the condition of high transmission power. When the communication apparatus 600b transmits a signal to the control apparatus 6100 or another communication apparatus, the communication controller 6104 reads the communication condition stored in the control information storage 607 and determines transmission parameters that conform to that condition. The communication controller 604 transmits the transmission data to the encoder 605. The encoder 605 creates encoded data in accordance with the determined transmission parameters. The transmitter 606 modulates the encoded data in accordance with the determined transmission parameters, and converts it into a form transmittable as a radio signal. At this time, the transmission power controller 608 controls the transmission power of the radio signal in accordance with the transmission parameters determined by the communication controller 604. In this case, the transmission power controller 608 makes the transmission power higher than a predetermined value.

Control in the case of the control apparatus 6100 communicating with the communication apparatus 600c is the same as the case of the control apparatus 6100 communicating with the communication apparatus 600b.

With the above described communication control, the control apparatus 6100 can set a low transmission power for the communication apparatus 600 with a high possibility of causing interference with the radio altimeter 2 and a high transmission power for the communication apparatus 600 with a low possibility of causing interference with the radio altimeter 2, according to the position information of the communication apparatuses 600. Accordingly, it is possible to construct a WAIC network capable of coexisting with the radio altimeter 2.

In the embodiments that have been described above and the embodiments that will be discussed below, a control apparatus including the control apparatus 6100 is provided independently of a communication apparatus. Alternatively, one of a plurality of communication apparatuses may include a function of the control apparatus, which is for example a function of the communication controller 604 of the communication apparatus 600. In this case, each communication apparatus 600 may have the function of managing the position information.

In a case where the communication apparatus 600 is attached to a mobile body so as to be movable, the control apparatus 6100 may estimate a distance between the communication apparatus 600 and the radio altimeter 2, and based on the estimation, update the position information of the communication apparatus 600.

In the present embodiment, description was made using the positional relation of the control apparatus 6100, the communication apparatuses 600 and the radio altimeter 2 shown in FIG. 34, but the present embodiment is not limited thereto. The similar effect as the above example can be obtained with a different number of communication apparatuses 600 or with different positions of the control apparatus 6100, the communication apparatus 600 and the radio altimeter 2. As an example, when the radio altimeter 2 is installed at a rear bottom portion of the fuselage of aircraft, the control apparatus 6100 performs control that lowers transmission power of the communication apparatus 600c. When the communication apparatus 600 is installed in a cargo area at a lower layer of the fuselage, or installed outside the fuselage, such as on a wing or under the fuselage, the communication controller 6104 of the control apparatus 6100, if determining that there is a possibility of the communication apparatus 600 causing interference with the radio altimeter 2 from the position information of such communication apparatus 600, determines the communication condition to be low transmission power and notifies the communication apparatus 600 of the communication condition.

Embodiment 7

The control apparatus 6100 shown in FIG. 35 may perform control that switches a directivity pattern of the antenna 611 of the communication apparatus 600 based on position information of the communication apparatus 600. A communication procedure between the control apparatus 6100 and the communication apparatus 600 in that case will be discussed. Here, the case of a radio altimeter 2 being installed at a front bottom portion of the fuselage of aircraft as shown in FIG. 34 will be discussed. The antenna 611 of the communication apparatus 600 as shown in FIG. 36 is provided with a plurality of directivity patterns, with the communication controller 604 switching between the directivity patterns. The position information acquisition unit 6107 of the control apparatus 6100 acquires the position information of the communication apparatus 600a, the communication apparatus 600b, and the communication apparatus 600c. When the radio altimeter 2 is installed at an external front bottom portion of the fuselage of aircraft, the effect of interference with the radio altimeter 2 is great at the communication apparatus 600a installed at a window side in the front of the fuselage, and small at the communication apparatus 600b installed at a central portion of the fuselage and at the communication apparatus 600c installed at a window side in the rear of the fuselage. When the control apparatus 6100 performs communication with the communication apparatus 600a, the position information acquisition unit 6107 of the control apparatus 6100 transmits the position information of the communication apparatus 600a to the communication controller 6104. The communication controller 6104 determines a communication condition to be used by the communication apparatus 600a for communication, on the basis of the position information of the communication apparatus 600a. Here, since the communication apparatus 600a is positioned at the window side in the front of the fuselage where there is risk of causing interference with the radio altimeter 2, the communication controller 6104 sets the condition of selecting a directivity pattern in which its maximum gain is not oriented in the direction of the window, and creates transmission data for notifying the communication apparatus 600a of that condition. The communication controller 6104 transmits the transmission data to the encoder 6105. The encoder 6105 encodes the transmission data, and transmits the encoded data to the transmitter 6106. The transmitter 6106, after modulating the encoded data into a form that can be transmitted by a radio signal, transmits the signal from the antenna 6101 to the communication apparatus 600a.

Figure 37:
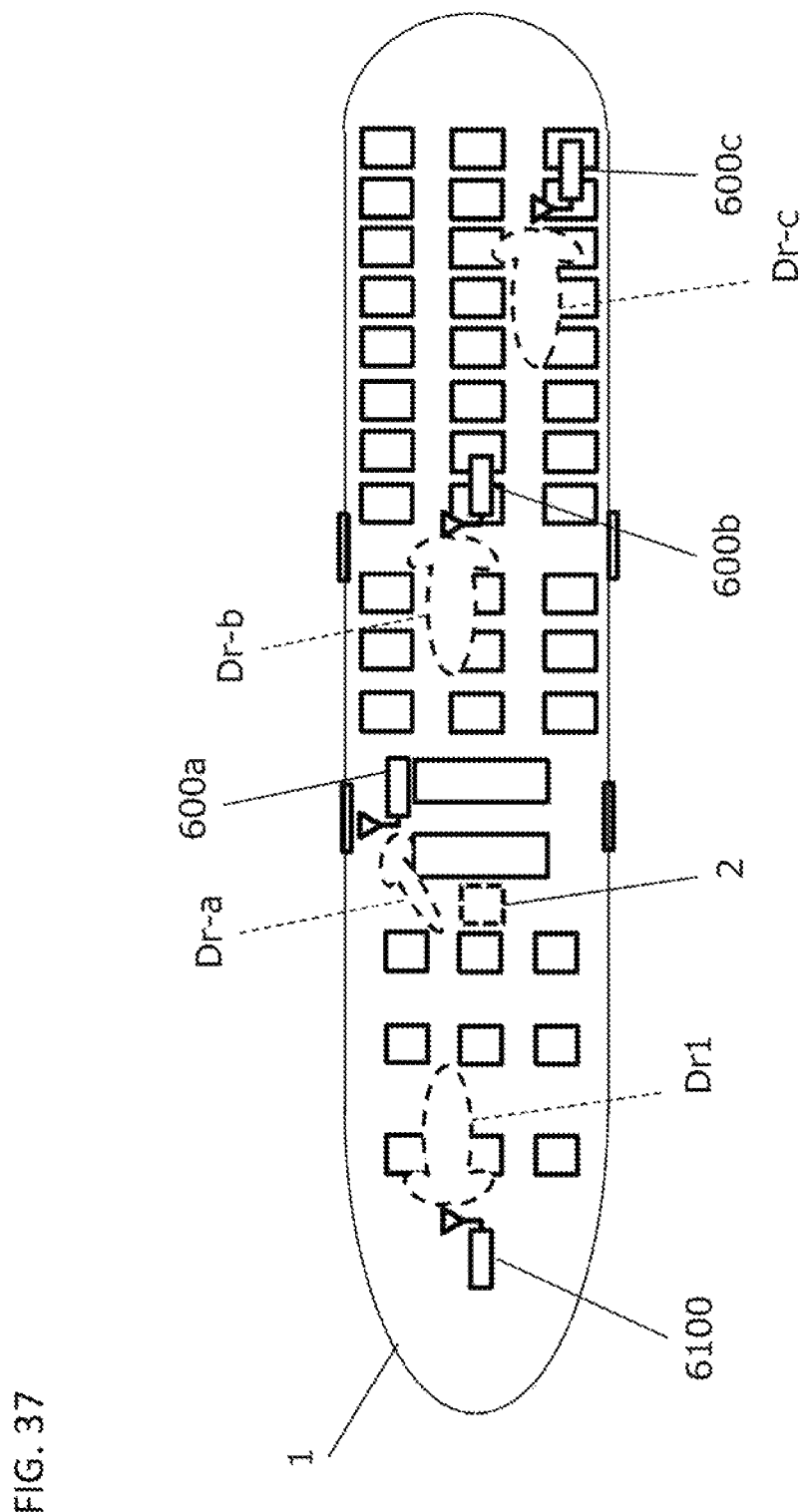
FIG. 37 shows antenna directivities of a plurality of communication apparatuses according to Embodiment 7.

Accordingly, as shown in FIG. 37, the communication apparatus 600a that is installed at the window side in the front of the fuselage can transmit the transmission signal using a beam pattern Dr-a whose maximum gain is at the front center side of the fuselage, and thereby can reduce interference with the radio altimeter 2 installed at the front bottom portion of the fuselage.

For the control apparatus 6100 and the communication apparatuses 600b, 600c that are installed at a position where interference with the radio diameter 2 is relatively small, the beam patterns Dr-1, Dr-b, Dr-c having normal maximum gains as shown in FIG. 37 are used.

Embodiment 8

Figure 38:
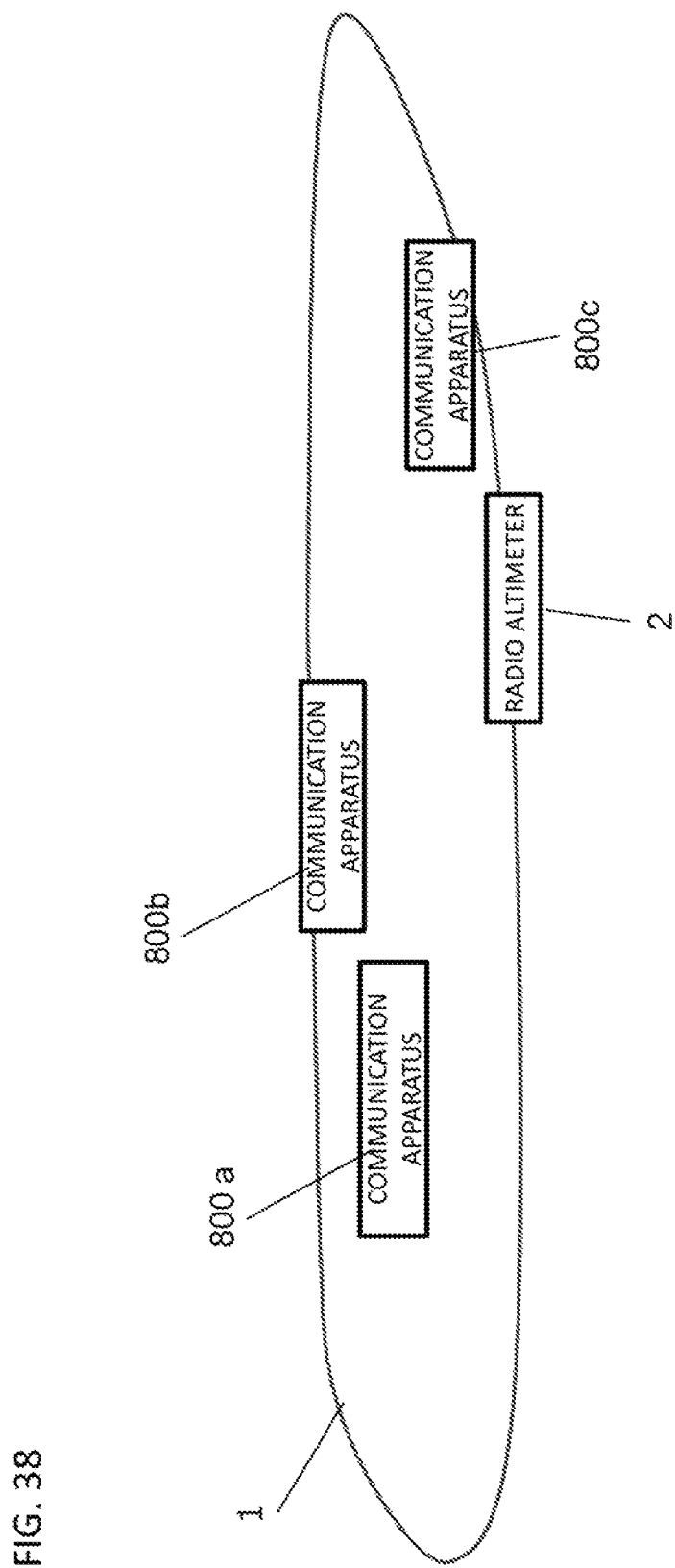
FIG. 38 shows a plurality of communication apparatuses and a radio altimeter installed in an aircraft according to Embodiment 8.

The present embodiment describes a communication apparatus that is installed near a radio altimeter 2 and notifies other communication apparatuses of the operation information of the radio altimeter 2. FIG. 38 shows a radio altimeter 2 and a plurality of communication apparatuses 800 (800a to 800c) that are installed in an aircraft 6. The communication apparatus 800c is installed near the radio altimeter 2 and can receive a signal transmitted by the transmitter 3 (FIG. 1) of the radio altimeter 2.

Figure 39:
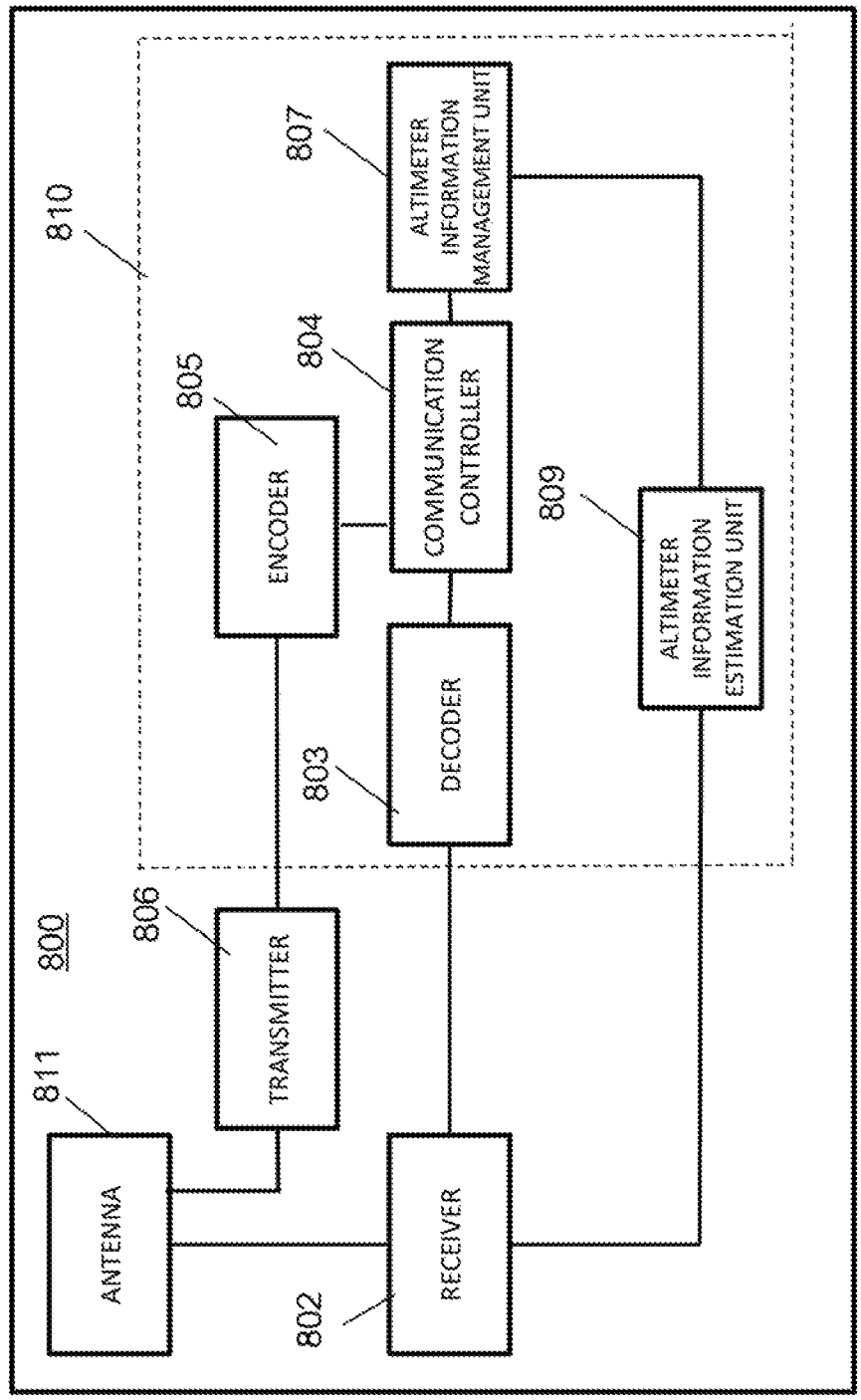
FIG. 39 shows a configuration of a communication apparatus according to Embodiment 8.

FIG. 39 shows the configuration of a communication apparatus 800. The communication apparatus 800 comprises an antenna 811, a receiver 802, a decoder 803, a communication controller 804, an altimeter information management unit 807, an altimeter information estimation unit 809, an encoder 805, and a transmitter 806.

The communication apparatus 800 includes a processor 810 including electronic circuitry such as a CPU. The processor 810 executes the functions of the decoder 803, the communication controller 804, the encoder 805, the altimeter information management unit 807, and the altimeter information estimation unit 809 by performing control and calculation according to a predetermined algorithm.

The altimeter information estimation unit 809 estimates information of the radio altimeter 2 from the signal of the radio altimeter 2 received by the receiver 802, specifically, from the frequency bandwidth being used, the triangle wave frequency (frequency sweep rate), the timing of the frequency sweep, or the like. The altimeter information estimation unit 809 transmits estimated information on the radio altimeter 2 to the altimeter information management unit 807. The altimeter information management unit 807 acquires the information on the radio altimeter 2 and stores it in a memory, and transmits the information on the radio altimeter 2 to the communication controller 804. Upon receiving an update value of the altitude information from the altimeter information estimation unit 809, the altimeter information management unit 807 updates the information stored in the memory. The communication apparatus 800 (e.g. 800c) notifies another one or other plurality of the communication apparatuses 800 (e.g. 800a, 800b) of the information on the radio altimeter 2. The communication controller 804 creates transmission data including the information on the radio altimeter 2 received from the altimeter information management unit 807. The encoder 805 encodes the transmission data. The transmitter 806 modulates the encoded data, generates a transmission signal, and transmits the signal from the antenna 811.

As in the example shown in FIG. 38, even if the communication apparatuses 800a, 800b cannot directly receive a signal from the radio altimeter 2, the communication apparatuses 800a, 800b can obtain operation information of the radio altimeter 2 that is estimated by the communication apparatus 800c, which is capable of directly receiving the signal from the radio altimeter 2. Accordingly, the communication apparatuses 800a, 800b are capable of transmitting signals using a communication system that does not cause interference with the radio altimeter 2.

As shown in FIG. 39, the communication apparatus 800c also comprises a receiver 802 and a decoder 803 and is capable of receiving not only a signal from the radio altimeter 2 but also signals from other communication apparatuses. The communication apparatus 800c calculates an SIR (signal-to-interference power ratio) from the power of the received signal from the radio altimeter 2 and from the power of the signal received from another communication apparatus. When the SIR is low, that is, when the signal power received from the other communication apparatus is higher, the communication apparatus 800c transmits to the other communication apparatus a signal instructing a change in the communication condition. For example, the communication apparatus 800c gives an instruction of a change in the communication condition such as lowering transmission power, changing a beam pattern, changing the frequency bandwidth used, shifting the timing of transmission, or the like.

When there are two or more other communication apparatuses 800 in the aircraft 16, the communication apparatus 800c may periodically broadcast the information on the radio altimeter 2. This enables the two or more other communication apparatuses 800 to be notified of the information on the radio altimeter 2. As a result, it is not necessary to notify the two or more other communication apparatuses 800 individually, and therefore, communication resources can be saved.

Embodiment 9

This embodiment describes a communication apparatus that transmits notice of a transmission timing that causes interference with the radio altimeter 2 to other communication apparatuses using the same frequency channel.

Figure 40:
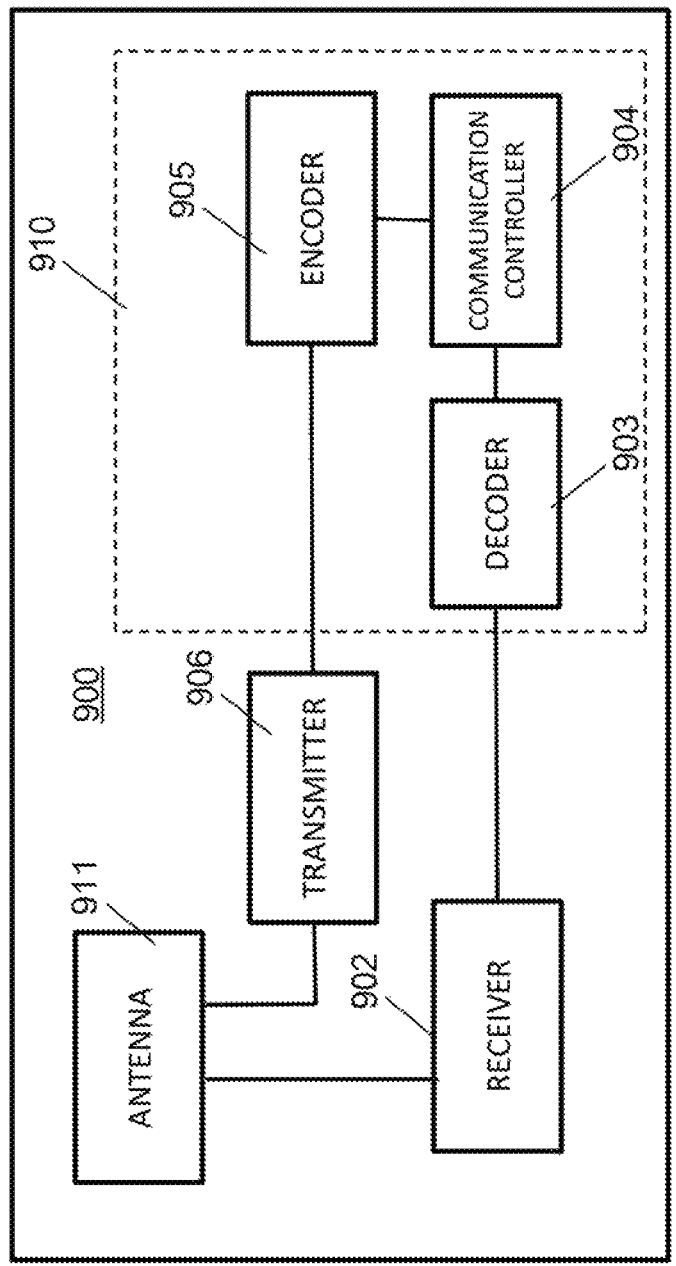
FIG. 40 shows a configuration of a communication apparatus according to Embodiment 9.

FIG. 40 shows the configuration of a communication apparatus 900 according to this embodiment. The communication apparatus 900 has the same configuration as the communication apparatus 200 (FIG. 9) according to Embodiment 2, and comprises an antenna 911, a receiver 902, a decoder 903, a communication controller 904, an encoder 905, and a transmitter 906. The communication apparatus 900 includes a processor 910 including electronic circuitry such as a CPU. The processor 910 executes the functions of the decoder 903, the communication controller 904, and the encoder 905 by performing control and calculation according to a predetermined algorithm.

The communication controller 904 of the communication apparatus 900 acquires a transmission timing of the radio altimeter 2. The communication controller 904 creates a transmission frame including a transmission prohibition time before the time when interference is given to the radio altimeter 2, and transmits the transmission frame to the encoder 905. The encoder 905 encodes the data of the transmission frame and transmits it to the transmitter 906. The transmitter 906 modulates the encoded data into a transmission signal, and transmits it to another communication apparatus through the antenna 911.

The communication controller of another communication apparatus, which has the same configuration as that of the communication apparatus 900, receives and decodes the thus created transmission frame with the transmission prohibition period, thereby acquiring the transmission prohibition period.

The communication apparatus 900 may use an RTS frame of the IEEE 802.11 standard as an example of a transmission frame including a transmission prohibition period.

Figure 41:
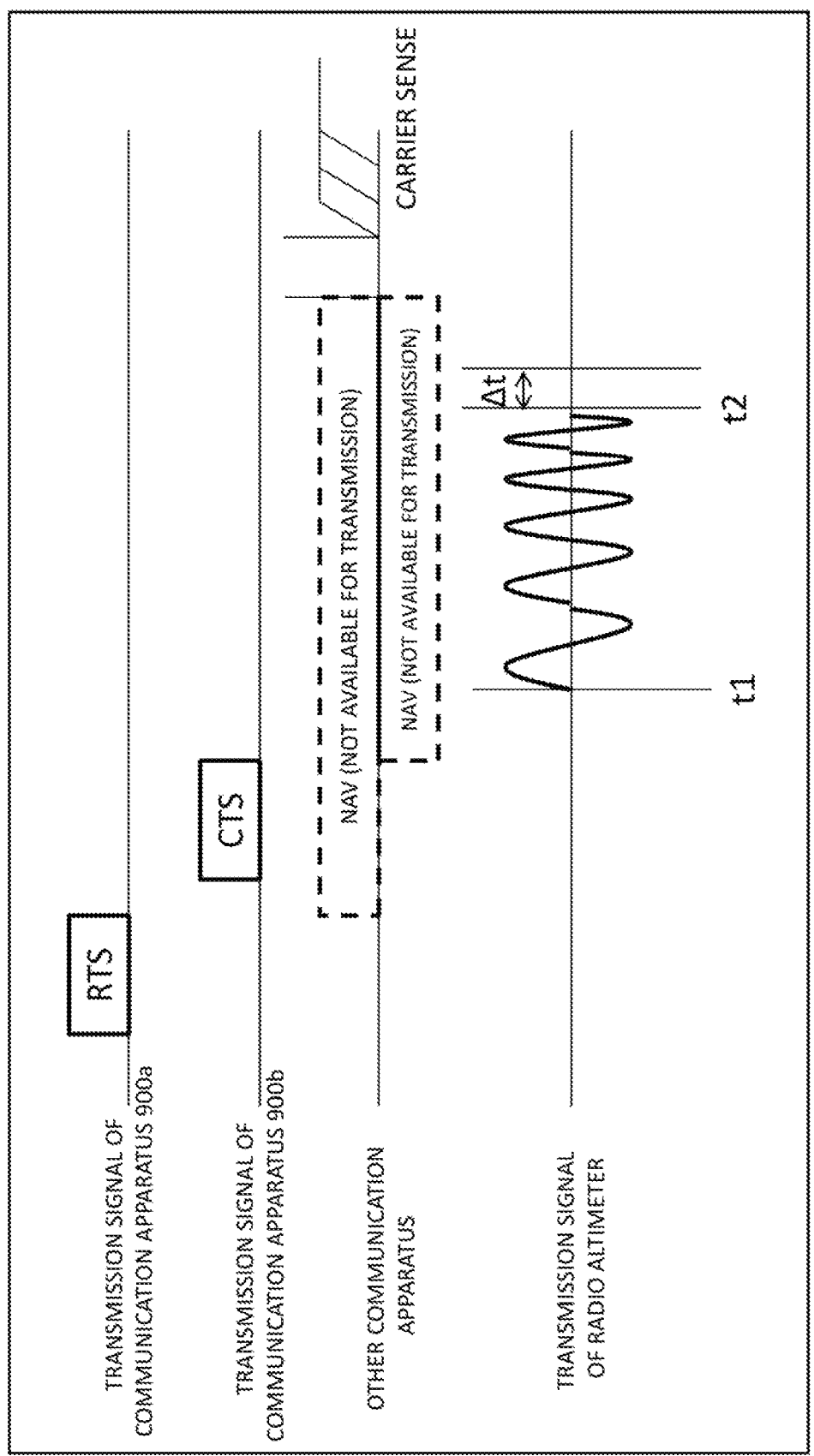
FIG. 41 shows a state of a transmission signal transmitted by a communication apparatus according to Embodiment 9.

FIG. 41 shows a RTS system according to the IEEE 802.11 standard. The communication controller of the communication apparatus 900a creates an RTS frame in which the NAV is set for a longer period than the period during which the radio altimeter 2 is given interference. The destination address of the communication apparatus 900b is described as a destination of the RTS frame. When the communication controller of the communication apparatus 900b receives an RTS frame, it similarly creates a CTS frame in which NAV is set and transmits it to another communication apparatus.

Accordingly, the communication apparatus 900a, another communication apparatus 900b that has received a RTS frame, still another communication apparatus that has received a CTS frame, and still another communication apparatus that has received both the RTS frame and the CTS frame are prevented from transmitting signals in the NAV period. Therefore, interference with the radio altimeter 2 does not occur. The other communication apparatus can start carrier sense when a predetermined time elapses after NAV ends, and can perform transmission when there is a transmission frame.

In the above description, the communication controller of the communication apparatus 900a uses the address of the communication apparatus 900b as a destination of the RTS frame. However, the present disclosure is not limited to this. For example, a dummy address may be described. Even in this case, although the communication apparatus that transmits a CTS frame is absent, any other communication apparatus that can receive a signal from the communication apparatus 900a can receive a RTS frame and read the NAV described therein, thereby setting a transmission prohibition period.

Even if the communication controller of the other communication apparatus can not perform carrier sense on the transmission signal of the radio altimeter 2, it can estimate a transmission timing of the radio altimeter from accumulated NAV information described in RTS frames.

Embodiment 10

The present embodiment describes a communication apparatus that reduces interference with the radio altimeter when relaying communication between a control apparatus and a communication apparatus through a plurality of other communication apparatuses.

Figure 42:
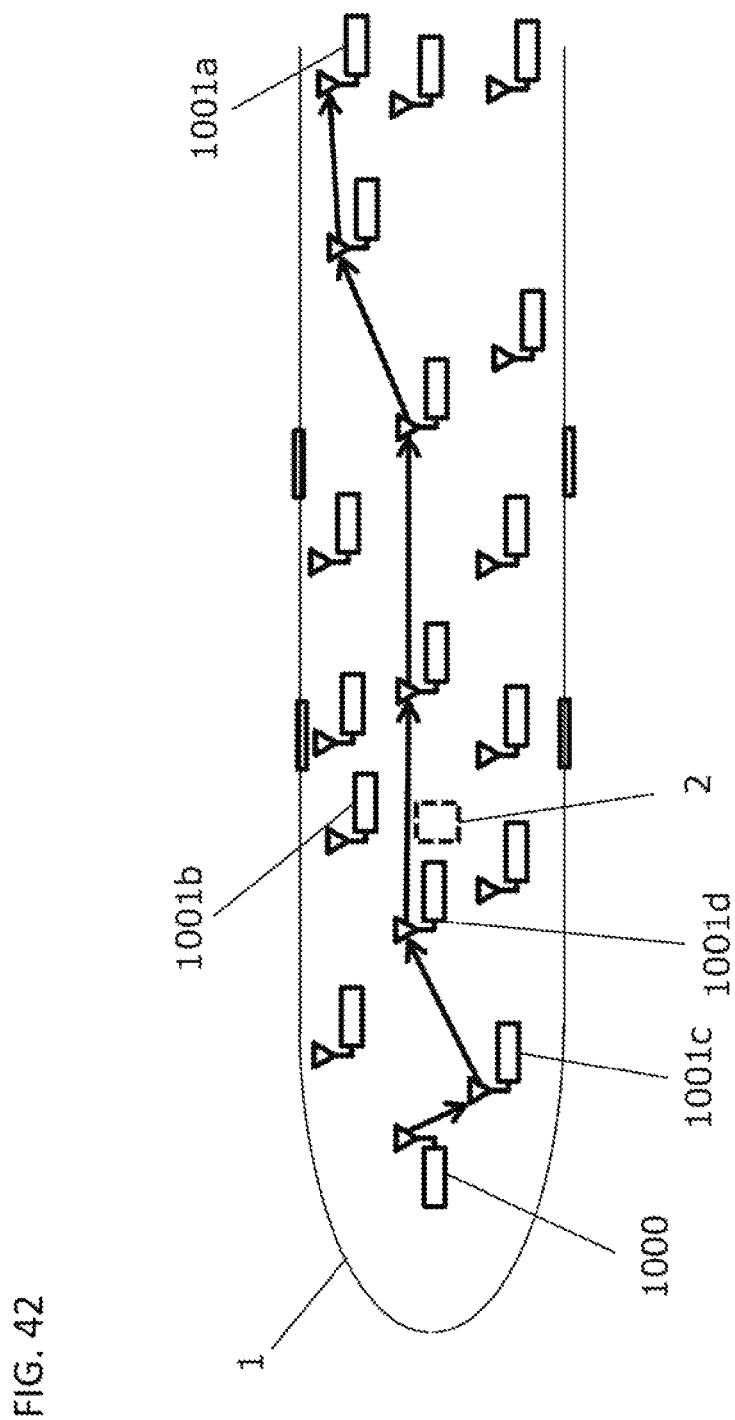
FIG. 42 shows a plurality of communication apparatuses and a radio altimeter installed in an aircraft according to Embodiment 10.

FIG. 42 shows a radio altimeter 2, a control apparatus 1000, and communication apparatuses 1001a, 1001b that are installed in the aircraft 1. Here, the radio altimeter 2 is installed at an external front bottom portion of the fuselage of aircraft 1. The case of communication between the control apparatus 1000 and communication apparatus 1001a will be considered.

Figure 43:
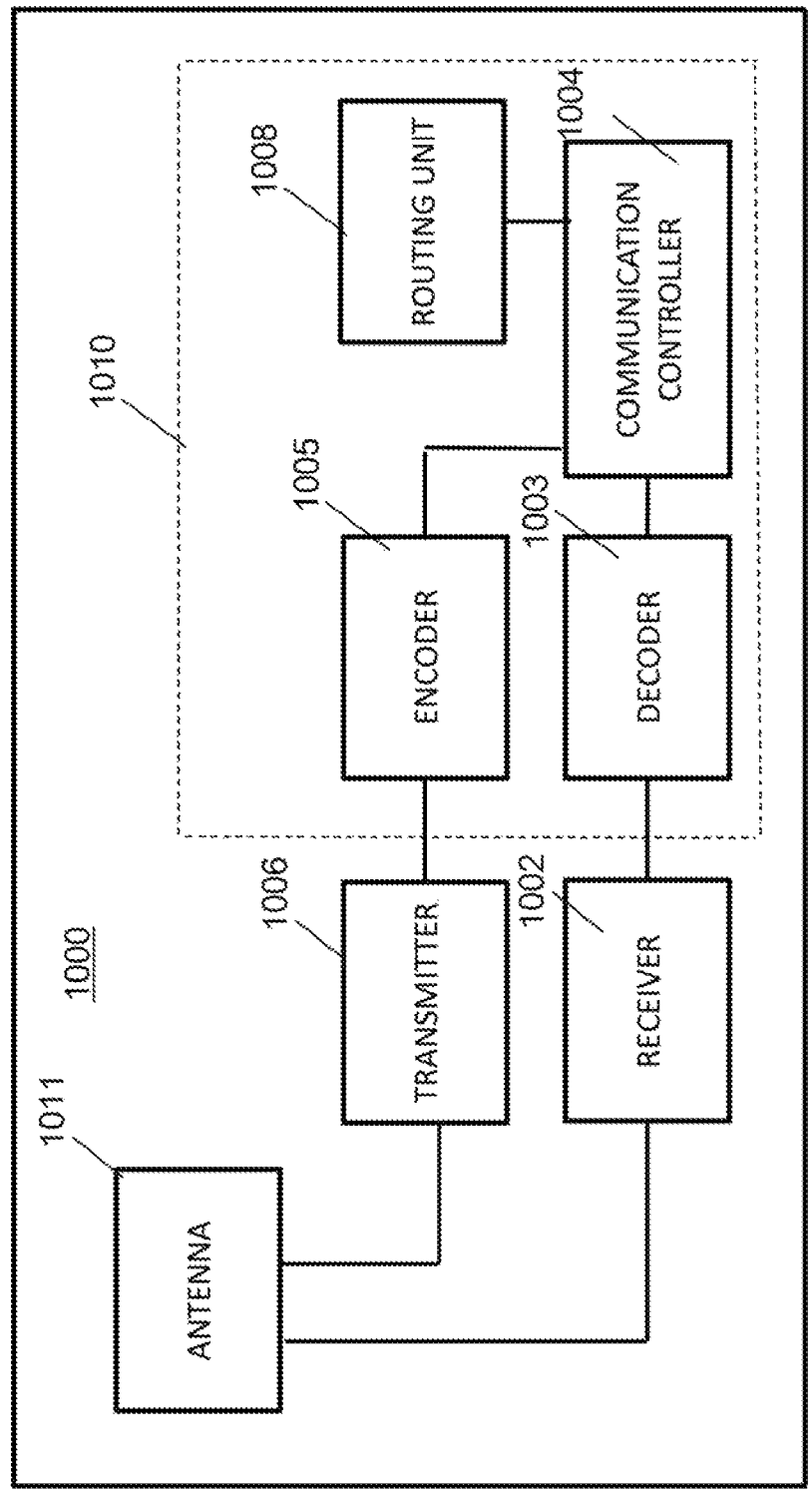
FIG. 43 shows a configuration of a control apparatus according to Embodiment 10.

FIG. 43 shows the configuration of a control apparatus 1000. The control apparatus 1000 comprises an antenna 1011, a receiver 1002, a decoder 1003, a communication controller 1004, a routing unit 1008, an encoder 1005, and a transmitter 1006. The routing unit 1008 creates a communication route between the control apparatus 1000 and the communication apparatus 1001a. The communication route is created from the position of the radio altimeter 2, the positions of the plurality of other communication apparatuses 1001, the position of the communication apparatus 1001a, and the position of the control apparatus 1000. As a guideline of route creation by the routing unit 1008, a communication apparatus that has a high possibility of causing interference with the radio altimeter 2 is not included in the communication route. In other words, the routing unit 1008 creates a communication route using the communication apparatuses in the central portion of the fuselage, as shown in FIG. 42, without using, for example, the communication apparatus 1001b that is installed at a window side at the front of the fuselage. When the control apparatus 1000 transmits a signal to the communication apparatus 1001a, the communication controller 1004 creates transmission data, including communication path information to the communication apparatus 1001a, with the data being addressed to the communication apparatus serving as a next relay node. The encoder 1005 encodes the transmission data. The transmitter 1006 modulates the encoded data, and after converting the modulated data into a form transmittable by radio signal, transmits the signal from the antenna 1011. The communication apparatus 1001c that has received the transmission signal from the control apparatus 1000 obtains an address of the communication apparatus 1001d serving as a next relay node based on the transmission path information included in the reception data, and transmits the relay data to that address.

The control apparatus 1000 of the present embodiment creates a communication route that does not include a communication apparatus 1001b installed at a window side of the front of the fuselage. As a result, the control apparatus 1000 can perform communication with the communication apparatus 1001a without using the communication apparatus 1001b that has a possibility of causing interference with the radio altimeter 2.

In the present embodiment, attention was focused only on the case of communication between the control apparatus 1000 and the communication apparatus 1001a. However, in the actual environment, the control apparatus 1000 performs communication with the plurality of communication apparatuses simultaneously. Communication among the communication apparatuses may also occur. In such a case, when using a communication route that excludes communication apparatuses that have a possibility of causing interference with the radio altimeter 2, there is risk of communication traffic being concentrated at a specific relay node. Concentration of communication traffic at a specific relay node leads to a drop in throughput.

For such a phenomenon, it is possible to avoid a drop in throughput by performing control of raising transmission power of a communication apparatus with a low possibility of causing interference with the radio altimeter 2, as performed by the control apparatus 6100 in Embodiment 6. Particularly, the control apparatus 1000 may increase communication capacity between the relay nodes by increasing transmission power of the communication apparatuses included in the communication route and at the same time raising their MCS, thereby improving the throughput.

The control apparatus 1000 may create a communication route that does not use the communication apparatus 1001c installed at a widow side of the rear of the fuselage of the aircraft 1, which has a possibility of causing interference with the radio altimeter 2 of another aircraft. This can reduce the effect of interference with the radio altimeter 2 of the other aircraft. In addition, in order for the control apparatus 1000 to acquire the position of the aircraft 9, the information may be acquired by connecting to a radar installed on the aircraft 1 or connecting to a device that collects information necessary for navigation.

Embodiment 11

This embodiment describes a communication apparatus that reduces interference with a radio altimeter of nearby aircraft.

Figure 44:
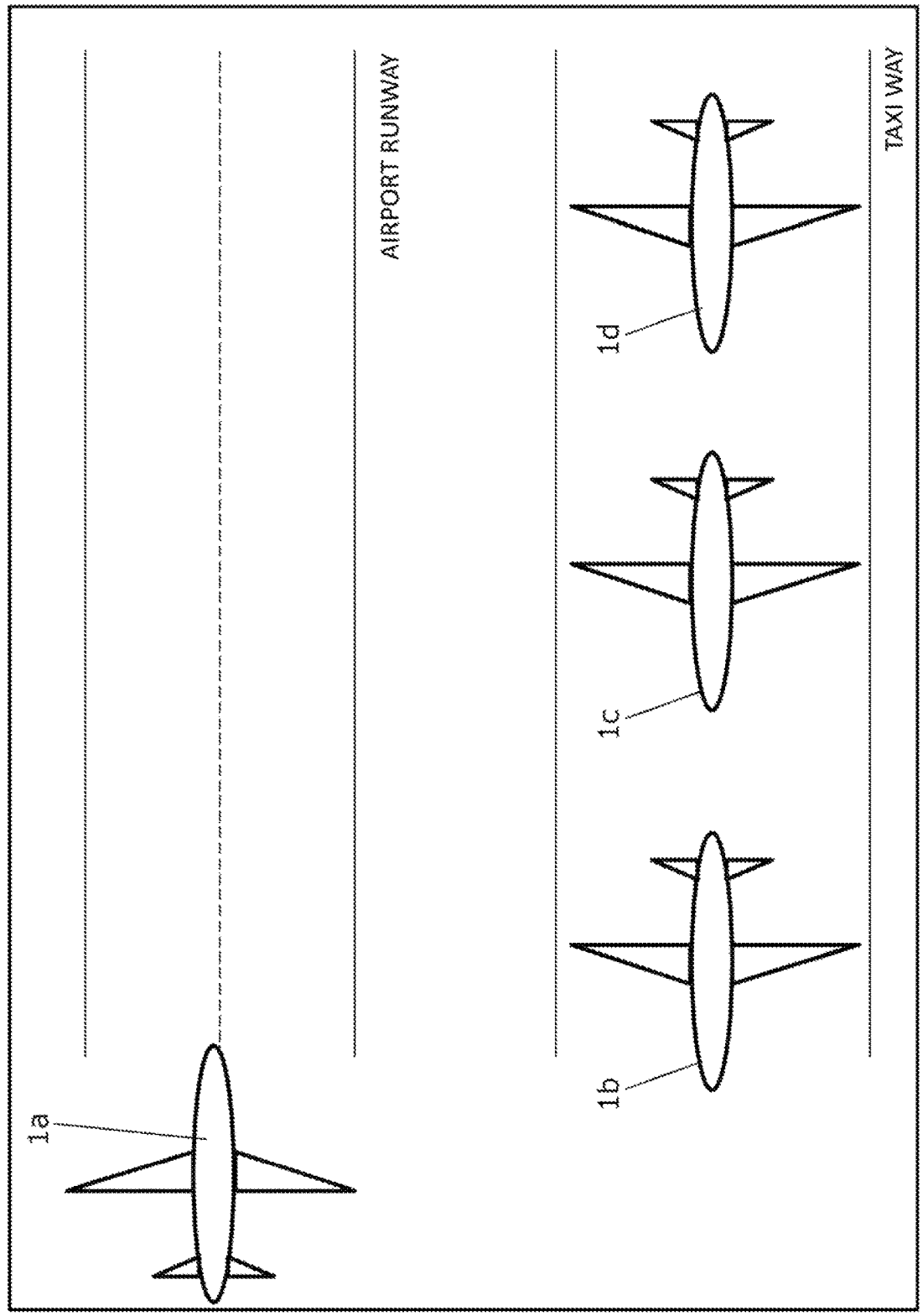
FIG. 44 shows positions of a plurality of aircraft in Embodiment 11.

FIG. 44 illustrates positions of aircraft 1a- to 1d present on an airport runway and taxiway. In this embodiment, a configuration and an operation of the communication apparatus will be discussed by taking a case where the aircraft 1b, the aircraft 1c, and the aircraft 1d are on the taxiway, and the aircraft 1a in the sky is about to land on the runway. If the communication apparatuses of the aircraft 1b to 1d perform WAIC communication using the 4.2 GHz to 4.4 GHz band, this would interfere with the radio altimeter of the landing aircraft 1a. The communication apparatus in this embodiment is a communication apparatus that performs WAIC communication in consideration of the frequency and time used by the radio altimeter of the aircraft 1a and the positional relationship with the aircraft 1a.

Figure 45:
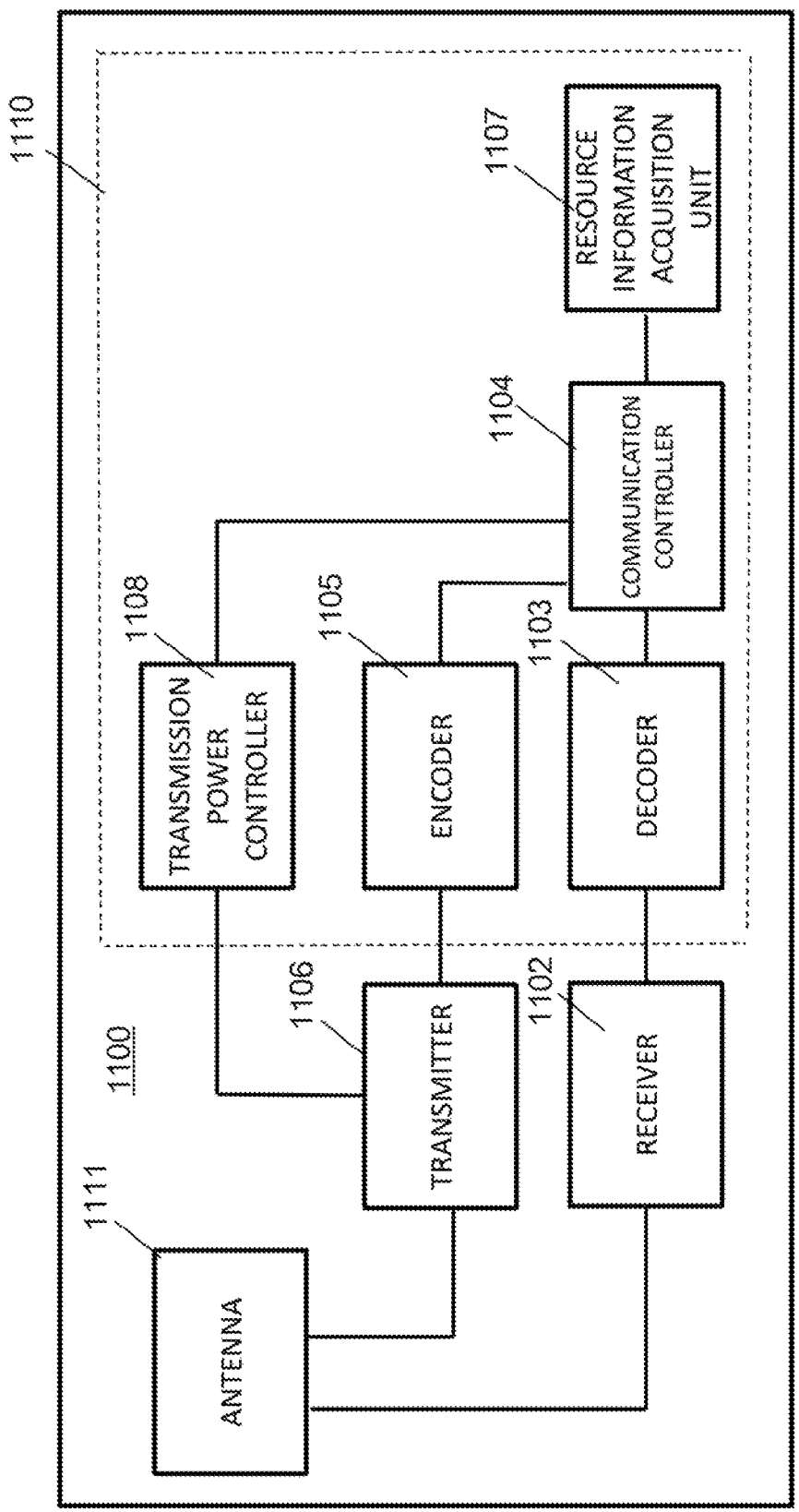
FIG. 45 shows a configuration of a communication apparatus according to Embodiment 11.

FIG. 45 shows the configuration of a communication apparatus 1100 installed in the aircraft 1b. The communication apparatus 1100 comprises an antenna 1111, a receiver 1102, a decoder 1103, a communication controller 1104, an encoder 1105, a transmitter 1106, a resource information acquisition unit 1107, and a transmission power controller 1108.

The communication apparatus 1100 comprises a processor 1110 including electronic circuitry such as a CPU. The processor 1110 executes the functions of the decoder 1103, the communication controller 1104, the encoder 1105, the resource information acquisition unit 1107, and the transmission power controller 1108 by performing control and calculation according to a predetermined algorithm.

The communication apparatus 1100 transmits a signal received by the antenna 1111 to the receiver 1102. The receiver 1102 performs reception processing and transmits the received signal, which has been digitized, to the decoder 1103. The decoder 1103 decodes the received signal to extract reception data. The communication controller 1104 reads a destination address included in the reception data, and when the reception data is addressed to the communication apparatus itself, performs processing of the reception data.

The resource information acquisition unit 1107 acquires transmission frequencies and timings of a plurality of adjacent radio altimeters 2 and/or directions in which adjacent aircraft exist (hereinafter referred to as resource information). The communication controller 1104 controls parameters or communication conditions such as transmission power, a directivity, a using frequency band, and a transmission timing, based on the acquired resource information.

When the communication apparatus 1100 transmits a signal to another communication apparatus, the communication controller 1104 acquires resource information from the resource information acquisition unit 1107. The communication controller 1104 generates data to be transmitted and determines transmission parameters based on the acquired resource information. The transmission parameters may include an antenna directivity, a coding scheme, a coding rate, a modulation scheme, a bandwidth, precoding information, a using channel, a transmission timing, transmission power, and the like. The communication controller 1104 transmits transmission data to the encoder 1105. The encoder 1105 performs an encoding process on the transmission data according to the parameters determined by the communication controller 1104 to generate encoded data. The transmitter 1106 modulates the encoded data according to the parameters determined by the communication controller 1104, and transmits the modulated data from the antenna 1101. At this time, the transmission power controller 1108 performs control so that the transmission power of the transmission signal transmitted from the transmitter 1106 has a value of the transmission power determined by the communication controller 1104.

(1) Resource Control Using a Position of the Aircraft 1a

The resource information acquisition unit 1107 acquires position information of the aircraft 1a. The resource information acquisition unit 1107 can use, as means for acquiring position information of the aircraft 1a, control information from the airport control tower, information from radar mounted on the aircraft 1a, or the like. The resource information acquisition unit 1107 acquires a positional relationship between the aircraft 1b and the aircraft 1a from the position information of the aircraft 1a acquired by the above means. When the communication controller 1104 transmits a signal to another WAIC communication apparatus, the communication controller 1104 acquires information on the positional relationship between the aircraft 1b and the aircraft 1a from the resource information acquisition unit 1107, and based on the information, determines a directivity pattern of the antenna 1101 for transmitting a transmission signal. The criterion for determining the directivity pattern may adopt, for example, using a pattern with a reduced gain in a direction in which the aircraft 1a exists.

In this way, the communication apparatus 1100 can reduce the amount of radio waves emitted in the direction in which the aircraft 1a exists. Therefore, interference with the radio altimeter of the aircraft 1a during its landing can be reduced.

(2) Resource Control Using Information on a Transmission Frequency of the Radio Altimeter of the Aircraft 1a

The resource information acquisition unit 1107 acquires a frequency of the signal transmitted by the radio altimeter of the aircraft 1a. When transmitting a signal to another WAIC communication apparatus, the communication controller 1104 acquires, from the resource information acquisition unit 1107, information on the frequency used by the radio altimeter of the aircraft 1a, and based on the information, determines a frequency channel or transmission timing for signal transmission. For example, as shown in FIG. 2, the transmission frequency of the radio altimeter 2 changes with time within a predetermined frequency range, and therefore, by using a frequency channel including a frequency that the radio altimeter 2 does not use, it is possible to avoid interference with the radio altimeter. In a case where the communication apparatus 1100 can transmit a signal only on a predetermined frequency channel, it is possible to avoid interference with the radio altimeter 2 by acquiring the time when the radio altimeter 2 does not use a frequency of the corresponding frequency channel and transmitting a WAIC communication signal in that time.

In this embodiment, a configuration and an operation of the communication apparatus 1100 of the aircraft 1b have been described with respect to the radio altimeter of the aircraft 1*a* of FIG. 44, but the present disclosure is not limited to this. Interference with a radio altimeter can be reduced and avoided by the same configuration and operation in the aircraft 1*c* or the aircraft 1*d*.

The communication apparatus 1100 may transmit transmission data according to a communication condition including only transmission frequency and/or transmission timing of the transmission data, without performing control of the transmission power.

The communication apparatus 1100 may transmit the acquired resource information and the determined communication condition to another communication apparatus so that the other communication apparatus can use those information. In this case, the communication apparatus 1100 may be a control apparatus that manages all other communication apparatuses, similarly to the control apparatus 6100 of Embodiment 6.

Embodiment 12

Figure 46:
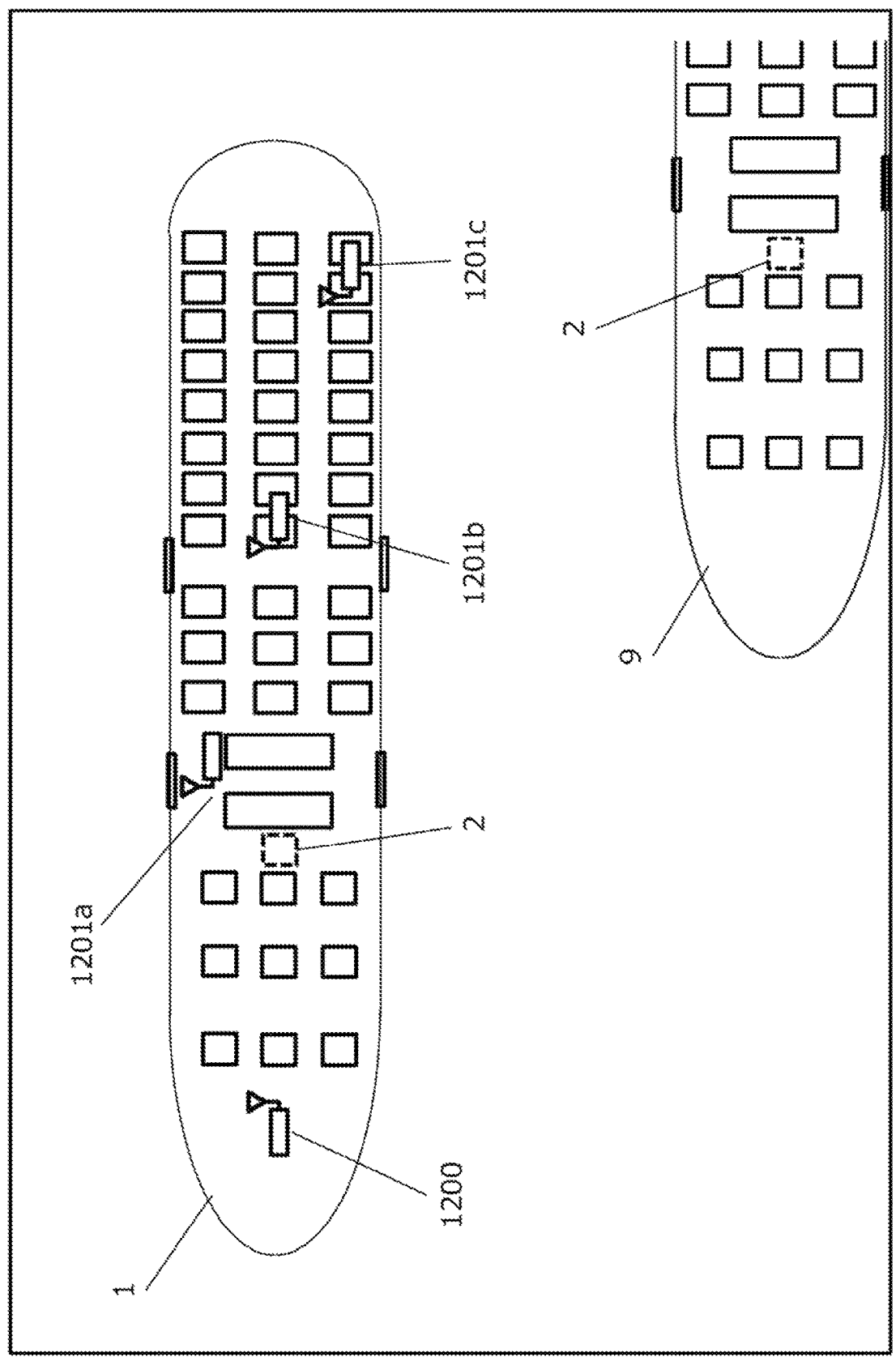
FIG. 46 shows a positional relationship between a plurality of communication apparatuses installed in an aircraft and a radio altimeter installed in another aircraft, according to Embodiment 12.

As shown in FIG. 46, when there is another aircraft in the vicinity of the aircraft 1, the communication apparatus in the aircraft 1 may interfere with the radio altimeter installed in the other aircraft. A case where an aircraft 9 is present behind a port side of the aircraft 1 as shown in FIG. 46 will be discussed.

The control apparatus 1200 has the same configuration as the communication apparatus of the other embodiments, such as the control apparatus 6100 of Embodiment 6. Each of the communication apparatuses 1201*a* to 1201*c* has the same configuration as the communication apparatus of the other embodiments, such as the communication apparatus 200 of Embodiment 2, the communication apparatus 600 of Embodiment 6, or the communication apparatus 1100 of Embodiment 11.

In this case, a transmission signal from the communication apparatus 1201*c* of the aircraft 1 causes interference with the radio altimeter 2 installed at an external bottom front of the fuselage of the aircraft 9. The communication controller of the control apparatus 1200 creates transmission data including a transmission condition for reducing the transmission power of the communication apparatus 1201*c*, and transmits the transmission data to the communication apparatus 1201*c*.

By doing so, the communication apparatus 1201*c* can perform communication while reducing an influence of interference to the radio altimeter 2 of the aircraft 9. In order for the position information acquisition unit of the control apparatus 1200 to acquire a position of the aircraft 9, an approach to acquire the information may be taken by connecting to radar installed in the aircraft 1 or connecting to a device that collects information necessary for navigation.

Embodiment 13

Figure 47:
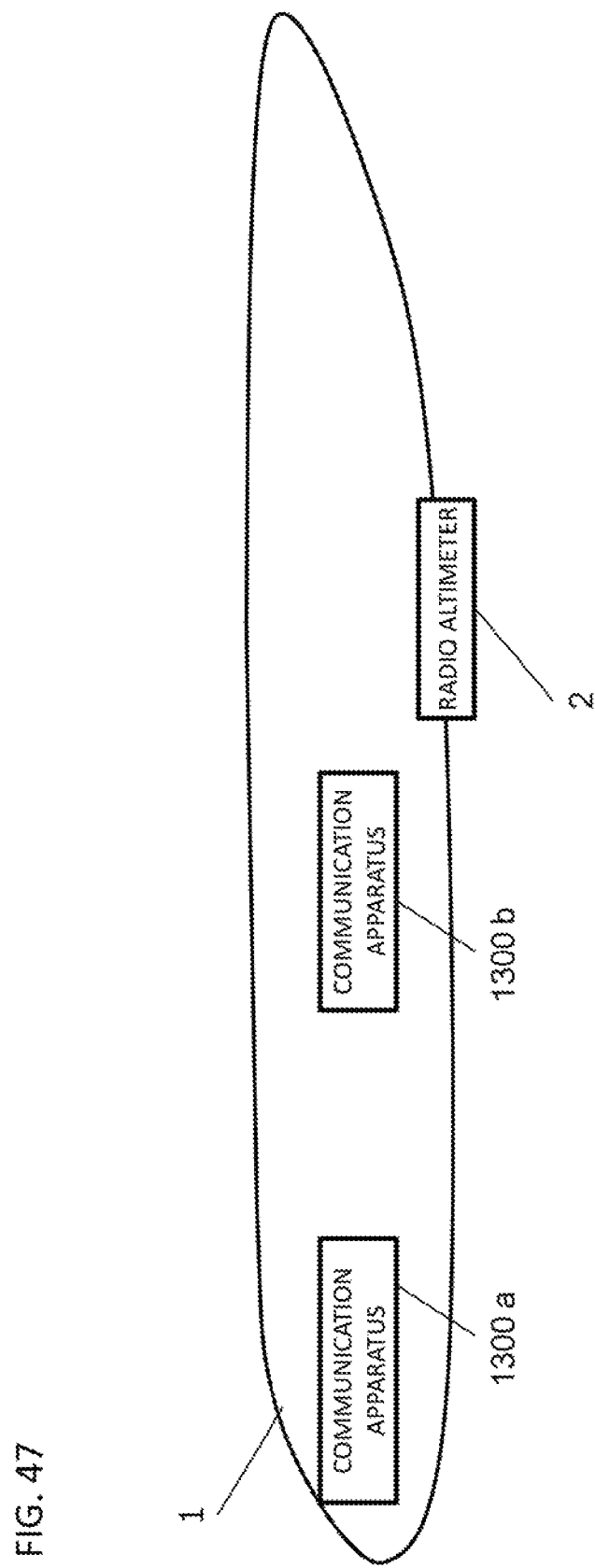
FIG. 47 shows a plurality of communication apparatuses and a radio altimeter installed in an aircraft according to Embodiment 13.

FIG. 47 shows a positional relationship between the radio altimeter 2, the communication apparatus 1300*a*, and the communication apparatus 1300*b* installed in the aircraft 1. In this embodiment, the communication apparatus 1300*a* and the communication apparatus 1300*b* that can transmit and receive a radio signal even when there is interference with the radio altimeter 2 will be discussed.

In FIG. 47, the following case will be discussed. A transmission signal of the radio altimeter 2 does not reach the communication apparatus 1300*a*, and therefore, is received with low power that can be regarded as noise. On the other hand, in the communication apparatus 1300*b*, a transmission signal of the radio altimeter 2 is received as an interference signal. The transmission signal of the communication apparatus 1300*a* does not reach the radio altimeter 2, but reaches the communication apparatus 1300*b*. In other words, the communication apparatus 1300*a* and the radio altimeter 2 do not interfere with each other, but the communication apparatus 1300*b* can receive a radio signal from both the communication apparatus 1300*a* and the radio altimeter 2.

Figure 48:
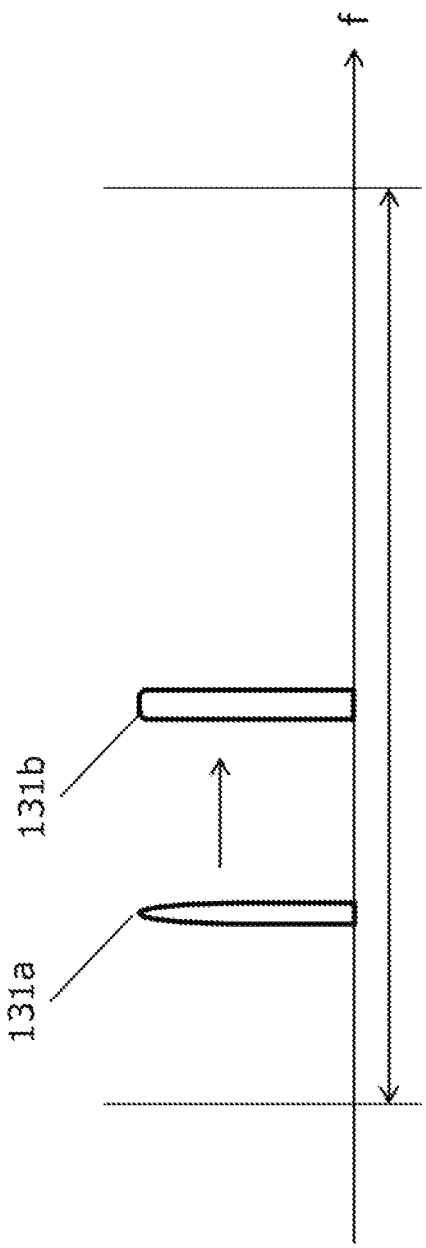
FIG. 48 shows a spectrum of an interference signal of a radio altimeter and a received signal of a communication apparatus.
Figure 49:
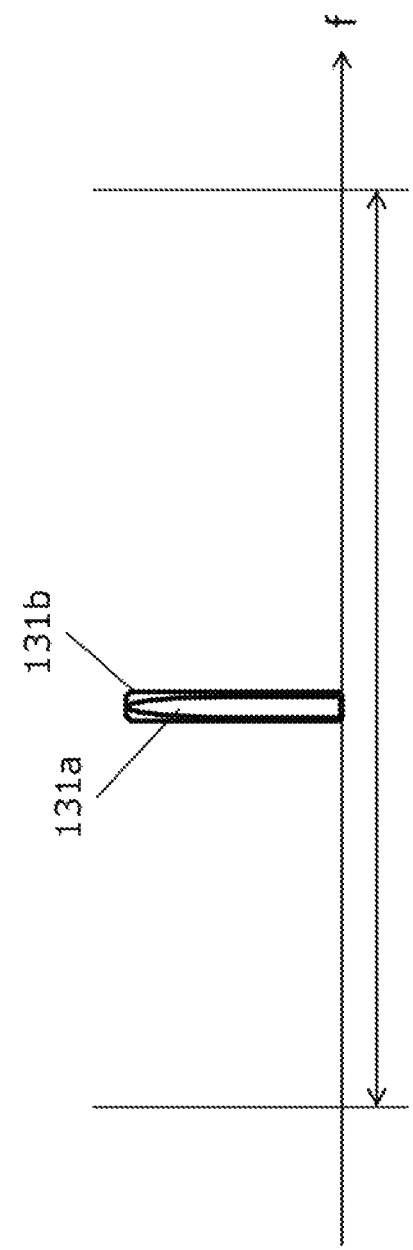
FIG. 49 shows a spectrum of an interference signal of a radio altimeter and a received signal of a communication apparatus.
Figure 50:
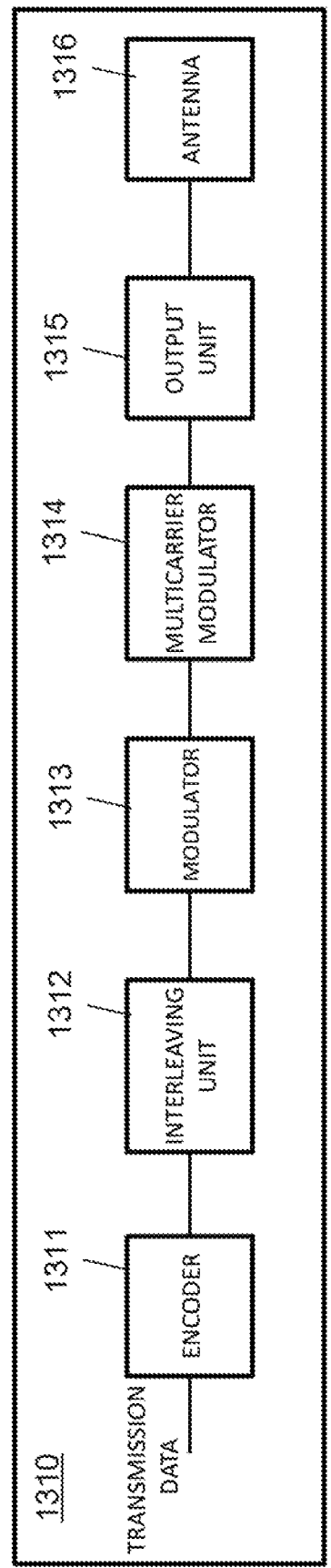
FIG. 50 shows a configuration of a receiver of a communication apparatus according to Embodiment 13.
Figure 51:
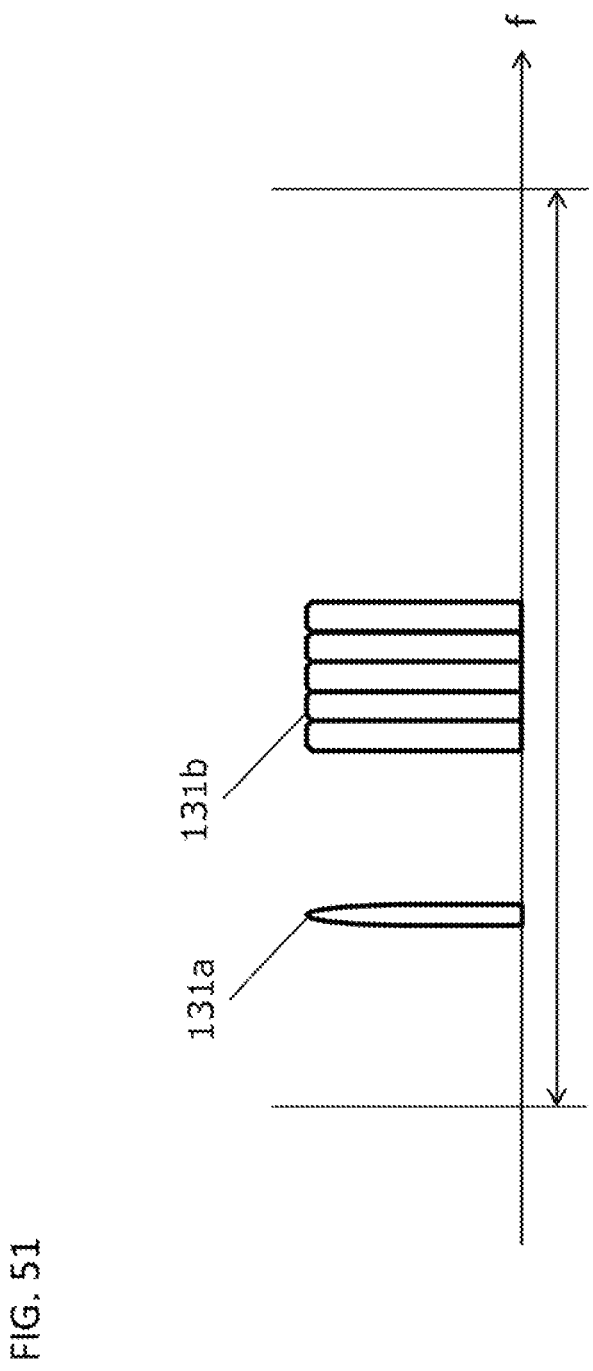
FIG. 51 shows a spectrum of an interference signal of a radio altimeter and a received signal of a communication apparatus according to Embodiment 13.

FIG. 48 and FIG. 49 illustrate spectra 131*a* and 131*b* that can be observed at a reception end of the communication apparatus 1300*b*. In FIG. 48, the spectrum 131*b*, which is a spectrum of a received signal from the communication apparatus 1300*a*, and the spectrum 131*a*, which is a spectrum of an interference signal from the radio altimeter 2, have different frequencies. Therefore, in this case, the communication apparatus 1300*b* can receive a transmission signal from the communication apparatus 1300*a* without interference. However, as shown in FIG. 49, when the frequencies of the spectrum 131*a* and the spectrum 131*b* are the same or overlapped, a signal from the radio altimeter 2 becomes interference, and the quality of a signal from the communication apparatus 1300*a* received by the communication apparatus 1300*b* deteriorates. In order to avoid this, the transmitter of each of the communication apparatuses 1300*a* and 1300*b* of this embodiment has a configuration shown in FIG. 50. The transmitter 1310 includes an encoder 1311, an interleaving unit 1312, a modulator 1313, a multicarrier modulator 1314, an output unit 1315, and an antenna 1316.

The encoder 1311 performs error correction encoding on transmission data. Here, the encoder 1311 uses an encoding scheme having a code length that is the same as or longer than the number of bits included in one symbol of a multicarrier modulation signal generated by the multicarrier modulator 1314. The interleaving unit 1312 rearranges the order of encoded transmission data. Specifically, the interleaving unit 1312 rearranges the order of transmission data with a size that is the same as or longer than the code length of the encoding scheme used by the encoder 1311. The modulator 1313 creates a modulated signal such as QPSK or QAM using the interleaved transmission data. The multicarrier modulator 1314 generates a single multicarrier modulation signal from a plurality of modulation signals. The output unit 1315 performs waveform shaping filter processing and frequency conversion processing on the multicarrier modulation signal, generates a radio signal waveform, and transmits it from the antenna 1316.

Figure 52:
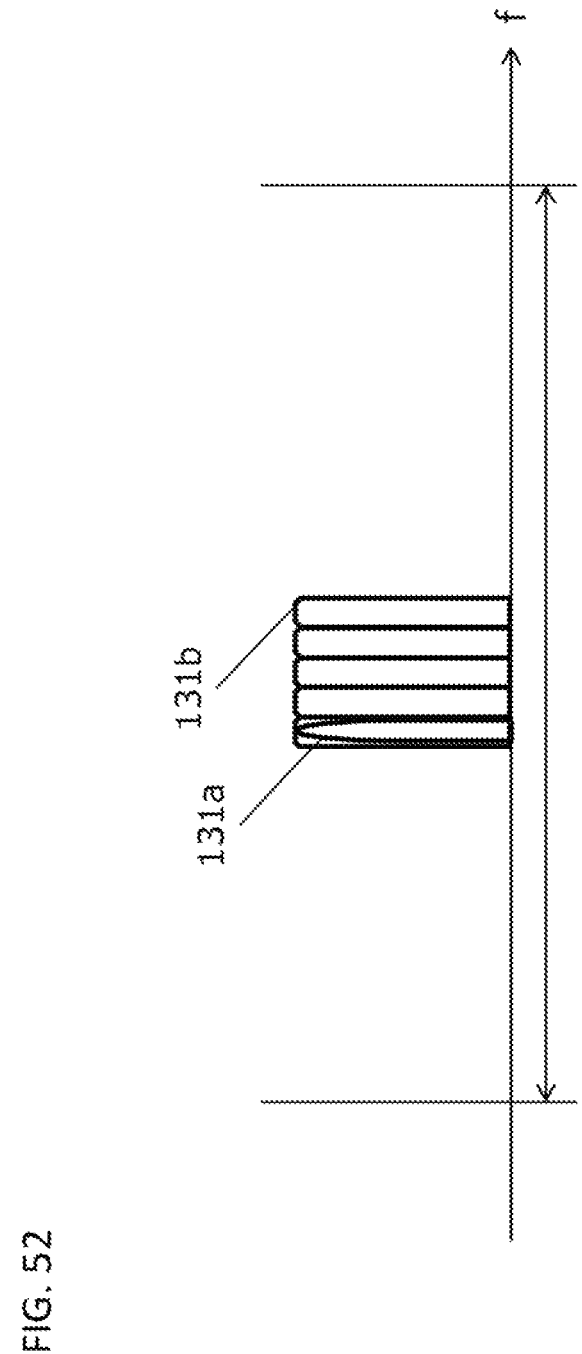
FIG. 52 shows a spectrum of an interference signal of a radio altimeter and a received signal of a communication apparatus according to Embodiment 13.
Figure 53:
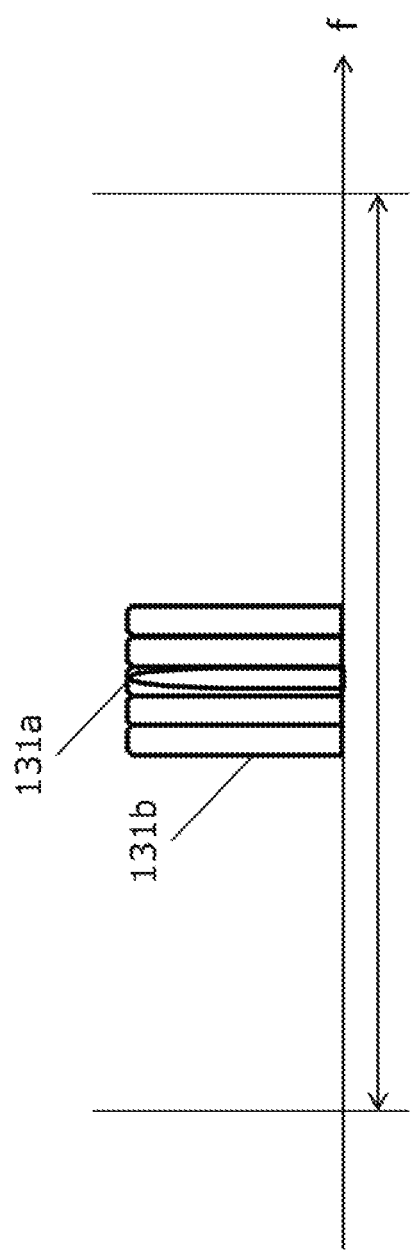
FIG. 53 shows a spectrum of an interference signal of a radio altimeter and a received signal of a communication apparatus according to Embodiment 13.
Figure 54:
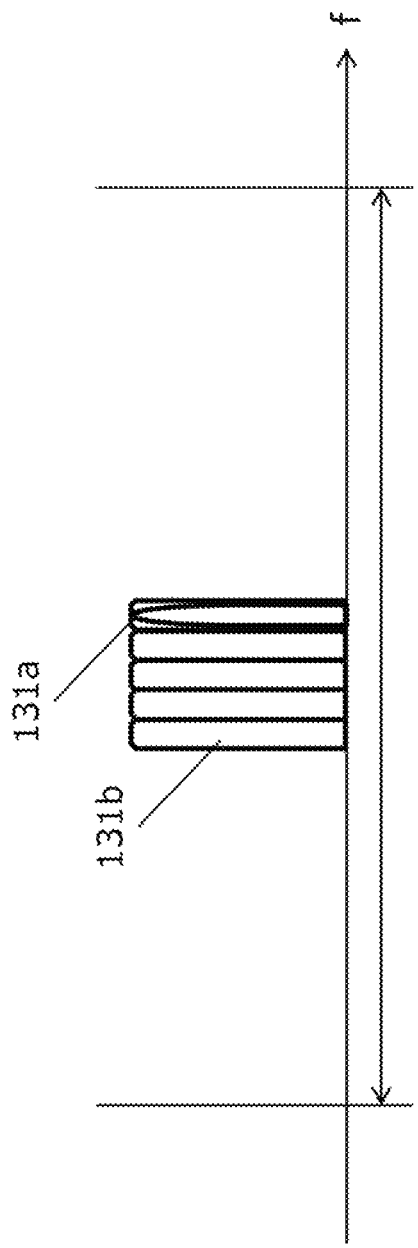
FIG. 54 shows a spectrum of an interference signal of a radio altimeter and a received signal of a communication apparatus according to Embodiment 13.

Since the transmitter 1310 uses a multicarrier modulation signal as a radio signal, even when the spectrum 131*a* of the radio altimeter 2 uses the same frequency as the spectrum 131*b* of the transmission signal of the communication apparatus 1300*a* as shown in FIG. 51 to FIG. 54, only some subcarriers of the multicarrier modulation signal are affected by the interference whereas the other subcarriers are not affected by the interference as shown in FIG. 52, FIG. 53, and FIG. 54. In addition, the encoder 1311 of the transmitter 1310 performs encoding processing with a code length that is the same as or longer than the number of bits of one symbol of the multicarrier modulation signal, and the interleaving unit 1312 rearranges the encoded bit sequence with a size that is the same as or longer than the code length. Accordingly, even if some subcarriers of the multicarrier modulation signal are affected by the interference and the reception quality deteriorates, reception errors due to the influence of interference can be corrected in a decoding process of the communication apparatus 1300b on a receiving side.

By using the communication apparatus 1300a of the present embodiment, it is possible to transmit a radio signal to the communication apparatus 1300b with high reception quality even in an environment where interference with the radio altimeter 2 exists.

In addition, in this embodiment, the case where the radio altimeter 2 interferes with the communication apparatus 1300b has been described. The same effect can be obtained even when, for example, a plurality of aircraft are present nearby as shown in FIG. 44 and the radio altimeter 2 installed in the other aircraft is an interference source.

REFERENCE NUMERALS

1 . . . Aircraft, 2 . . . Radio altimeter, 3 . . . Transmitter, 4 . . . Receiver, 9 . . . Aircraft, 10b . . . Bottom part, 16 . . . Aircraft, 22 . . . Frequency mixer, 24 . . . Reception LPF, 26 . . . Frequency counter, 27 . . . Altitude alarm, 28 . . . Altitude indicator, 29 . . . Sweep generator, 30 . . . voltage control oscillator, 31 . . . Buffer amplifier, 100, 200, 300, 300a to 300b, 400, 500, 600, 600a to 600c, 800, 800a to 800c, 900, 900a to 900b, 1000, 1000a to 1000d, 1100, 1200, 1201a to 1201c, 1300a to 1300b . . . Communication apparatus, 102, 202, 302, 402, 502, 602, 802, 902, 1002, 1102, 6102 . . . Receiver, 103, 203, 303, 403, 503, 603 803, 903, 1003, 1103, 6103 . . . Decoder, 104, 204, 304, 404, 504, 604, 804, 904, 1004, 1104, 6104 . . . Communication controller, 105, 205, 305, 405, 505, 605 805, 905, 1005, 1105, 6105 . . . Encoder, 106, 206, 306, 406, 506, 606, 806, 906, 1006, 1106, 6106 . . . Transmitter, 107, 507 . . . Altitude information acquisition unit, 108, 608, 1108 . . . Transmission power controller, 110, 210, 310, 410, 510, 610, 810, 910, 1110 . . . Processor, 111, 211, 311, 511, 611, 811, 911, 1011, 1101, 1111 6101, 6111 . . . Antenna, 131a . . . Spectrum, 131b . . . Spectrum, 411 . . . Antenna array, 312 . . . Interleaving unit, 607 . . . Control information storage, 807 . . . Altimeter information management unit, 809 . . . Altimeter information estimation unit, 1000, 6100 . . . Controller, 1008 . . . Routing unit, 1107 . . . Resource information acquisition unit, 1310 . . . Transmitter, 1311 . . . Encoder, 1312 . . . Interleaving unit, 1313 . . . Modulator, 1314 . . . Multicarrier modulator, 1315 . . . Output unit, 1316 . . . Antenna, 6107 . . . Position information acquisition unit

PRIOR ART DOCUMENT

Patent Document

[Patent Document 1] US Patent Application Publication No. 2017/0176588
[Patent Document 1] US Patent Application Publication No. 2017/0180072
[Patent Document 1] US Patent Application Publication No. 2017/0181146

The invention claimed is:

1. A communication apparatus configured to be installed in a first aircraft, the communication apparatus comprising:
an antenna;
a controller configured to acquire resource information and determine a communication condition based on the resource information, the resource information being related to a second aircraft different from the first aircraft or to a radio altimeter installed in the second aircraft; and
a transmitter configured to transmit transmission data to one other communication apparatus installed in the first aircraft, according to the communication condition,
wherein the resource information includes at least one of: a transmission frequency of the radio altimeter; a transmission timing of a signal from the radio altimeter; and position information of the second aircraft,
wherein the communication condition includes at least one of: transmission power for the transmission data of the communication apparatus; a transmission frequency/frequency band/transmission timing for the transmission data; and a directivity of an antenna,
wherein the controller determines the communication condition based on the resource information to reduce an interference with the radio altimeter,
wherein the controller is configured to acquire position information of the second aircraft,
wherein the controller is configured to change a directivity pattern of the antenna based on the position information,
wherein the controller is configured to determine a route for transmission of the transmission data to the one other communication apparatus based on the position information, and
wherein the controller is configured to exclude a still other communication apparatus from the route upon determining that the still other communication apparatus could interfere with the radio altimeter installed in the second aircraft.

2. The communication apparatus according to claim 1, wherein the controller is configured to change the directivity pattern so as to reduce a gain in a direction in which the second aircraft is located with respect to the first aircraft.

3. The communication apparatus according to claim 1, wherein the controller is configured to cause the transmitter to transmit the resource information to the one other communication apparatus.

4. The communication apparatus according to claim 1, wherein the controller is configured to cause the transmitter to transmit the determined communication condition to the one other communication apparatus.

5. A communication control method to be performed by a communication apparatus configured to be installed in a first aircraft, the communication apparatus including an antenna, the method including:
acquiring resource information, the resource information being related to a second aircraft different from the first aircraft or to a radio altimeter installed in the second aircraft;
determining a communication condition based on the resource information; and
transmitting transmission data to one other communication apparatus installed in the first aircraft, according to the communication condition,
wherein the resource information includes at least one of: a transmission frequency of the radio altimeter; a transmission timing of a signal from the radio altimeter; and position information of the second aircraft,
wherein the communication condition includes at least one of: transmission power for the transmission data of the communication apparatus; a transmission frequency/frequency band/transmission timing for the transmission data; and a directivity of an antenna, wherein the communication condition is determined based on the resource information to reduce an interference with the radio altimeter,
wherein the method further comprises:
  acquiring position information of the second aircraft;
  changing a directivity pattern of the antenna based on the position information;
  determining a route for transmission of the transmission data to the one other communication apparatus based on the position information; and
  excluding a still other communication apparatus from the route upon determining that the still other communication apparatus could interfere with the radio altimeter installed in the second aircraft.

* * * * *